(12) United States Patent
Foster et al.

(10) Patent No.: US 12,079,013 B2
(45) Date of Patent: Sep. 3, 2024

(54) SYSTEMS AND METHODS FOR TAKING, PROCESSING, RETRIEVING, AND DISPLAYING IMAGES FROM UNMANNED AERIAL VEHICLES

(71) Applicant: Pictometry International Corp., Rochester, NY (US)

(72) Inventors: Mark A. Foster, Fairport, NY (US); Frank Gluffrida, Honeoye Falls, NY (US); Antony Parchment, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 17/495,988

(22) Filed: Oct. 7, 2021

(65) Prior Publication Data
US 2022/0026929 A1     Jan. 27, 2022

Related U.S. Application Data

(62) Division of application No. 15/401,999, filed on Jan. 9, 2017, now abandoned.
(Continued)

(51) Int. Cl.
*G06T 7/70*     (2017.01)
*B64C 39/02*     (2023.01)
(Continued)

(52) U.S. Cl.
CPC ......... *G05D 1/1064* (2019.05); *B64C 39/024* (2013.01); *B64D 17/80* (2013.01);
(Continued)

(58) Field of Classification Search
CPC .... G05D 1/1064; G05D 1/106; G05D 1/0094; G06F 16/5866; B64C 39/024; B64D 45/00; B64D 47/08; B64D 17/80; G01V 99/005
(Continued)

(56) References Cited

U.S. PATENT DOCUMENTS 2,273,876 A    2/1942   Lutz et al.
3,153,784 A   10/1964   Petrides et al.
(Continued)

FOREIGN PATENT DOCUMENTS

AT     331204 T     7/2006
BR     0316110     9/2005
(Continued)

OTHER PUBLICATIONS

Ackermann, Prospects of Kinematic GPS Aerial Triangulation, ITC Journal, 1992.
(Continued)

*Primary Examiner* — Hai Tao Sun
(74) *Attorney, Agent, or Firm* — DUNLAP CODDING, P.C.

(57) ABSTRACT

Systems and methods for taking, processing, retrieving, and/or displaying images from unmanned aerial vehicles are disclosed, including an unmanned aerial vehicle, comprising: an image capture device; and a controller configured to: determine a flight plan of the unmanned aerial vehicle, the flight plan configured such that the unmanned aerial vehicle and fields of view of the image capture device are restricted to a geographic area within boundaries of a geographic location identified by coordinates of the geographic location; execute the flight plan; and capture, with the image capture device, one or more aerial images restricted to fields of view within the boundaries of the geographic location while
(Continued)

executing the flight plan, such that items outside of the boundaries are not captured in the one or more aerial images.

19 Claims, 27 Drawing Sheets

Related U.S. Application Data

(60) Provisional application No. 62/413,483, filed on Oct. 27, 2016, provisional application No. 62/276,539, filed on Jan. 8, 2016.

(51) Int. Cl.
*B64D 17/80* (2006.01)
*B64D 45/00* (2006.01)
*B64D 47/08* (2006.01)
*G01V 20/00* (2024.01)
*G05D 1/00* (2006.01)
*G05D 1/10* (2006.01)
*G06F 16/58* (2019.01)
*B64U 101/30* (2023.01)
*G06F 3/04817* (2022.01)

(52) U.S. Cl.
CPC .............. *B64D 45/00* (2013.01); *B64D 47/08* (2013.01); *G01V 20/00* (2024.01); *G05D 1/0094* (2013.01); *G05D 1/106* (2019.05); *G06F 16/5866* (2019.01); *B64D 2201/00* (2013.01); *B64U 2101/30* (2023.01); *G06F 3/04817* (2013.01); *G06T 7/70* (2017.01); *G06T 2207/10032* (2013.01)

(58) Field of Classification Search
USPC .......................................................... 702/5
See application file for complete search history.

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 4,964,598 A | 10/1990 | Berejik et al. |
| 5,034,812 A | 7/1991 | Rawlings |
| 5,067,674 A | 11/1991 | Heyche et al. |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,277,380 A | 1/1994 | Cycon et al. |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,372,337 A | 12/1994 | Kress et al. |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,581,258 A | 12/1996 | Khvilivitzky |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,904,724 A | 5/1999 | Margolin |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |

(56) References Cited

U.S. PATENT DOCUMENTS

| | | |
|---|---|---|
| 6,742,741 B1 | 6/2004 | Rivoli |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,847,865 B2 | 1/2005 | Carroll |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,130,741 B2 | 10/2006 | Bodin et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,509,241 B2 | 3/2009 | Guo |
| 7,584,071 B2 | 9/2009 | Lee |
| 7,728,833 B2 | 6/2010 | Verma |
| 7,832,267 B2 | 11/2010 | Woro |
| 7,844,499 B2 | 11/2010 | Yahiro |
| 7,922,115 B2 | 4/2011 | Colgren et al. |
| 7,962,296 B2 | 6/2011 | Ashton |
| 7,969,346 B2 | 6/2011 | Franceschini et al. |
| 8,078,396 B2 | 12/2011 | Meadow |
| 8,103,398 B2 | 1/2012 | Duggan et al. |
| 8,106,748 B2 | 1/2012 | Lee |
| 8,242,623 B2 | 8/2012 | Lucero et al. |
| 8,346,578 B1 | 1/2013 | Hopkins, III et al. |
| 8,391,144 B1 | 3/2013 | Pannell et al. |
| 8,418,959 B2 | 4/2013 | Kang et al. |
| 8,422,825 B1 | 4/2013 | Neophytou et al. |
| 8,705,843 B2 | 4/2014 | Lieckfeldt |
| 8,740,134 B2 | 6/2014 | Suzuki |
| 8,874,283 B1 | 10/2014 | Cavote |
| 8,931,144 B2 | 1/2015 | Freeman et al. |
| 8,991,758 B2 | 3/2015 | Earon |
| 9,016,617 B2 | 4/2015 | Wang et al. |
| 9,162,753 B1 | 10/2015 | Panto et al. |
| 9,250,630 B2 | 2/2016 | Downey et al. |
| 9,256,225 B2 | 2/2016 | Downey et al. |
| 9,256,994 B2 | 2/2016 | Downey et al. |
| 9,273,981 B1 | 3/2016 | Downey et al. |
| 9,310,221 B1 | 4/2016 | Downey et al. |
| 9,311,760 B2 | 4/2016 | Downey et al. |
| 9,330,504 B2 | 5/2016 | Ege |
| 9,340,283 B1 | 5/2016 | Downey et al. |
| 9,403,593 B2 | 8/2016 | Downey et al. |
| 9,406,237 B2 | 8/2016 | Downey et al. |
| 9,437,033 B2 | 9/2016 | Sun et al. |
| 9,437,044 B2 | 9/2016 | Ege et al. |
| 9,501,760 B2 | 11/2016 | Stanley et al. |
| 9,513,635 B1 | 12/2016 | Bethke et al. |
| 9,588,516 B1 | 3/2017 | Gurel et al. |
| 9,592,912 B1 | 3/2017 | Michini et al. |
| 9,607,522 B2 | 3/2017 | Downey et al. |
| 9,609,288 B1* | 3/2017 | Richman ............. G06Q 50/16 |
| 9,613,538 B1 | 4/2017 | Poole et al. |
| 9,618,940 B1 | 4/2017 | Michini et al. |
| 9,658,619 B1 | 5/2017 | Bethke et al. |
| 9,679,227 B2 | 6/2017 | Taylor et al. |
| 9,851,716 B2 | 12/2017 | Kugelmass |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |

| | | |
|---|---|---|
| 2003/0164962 A1 | 9/2003 | Nims et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2004/0193334 A1 | 9/2004 | Carlsson et al. |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2007/0244608 A1 | 10/2007 | Rath et al. |
| 2008/0120031 A1 | 5/2008 | Rosenfeld et al. |
| 2008/0123994 A1 | 5/2008 | Schultz et al. |
| 2008/0125920 A1 | 5/2008 | Miles et al. |
| 2008/0158256 A1 | 7/2008 | Russell et al. |
| 2009/0177458 A1 | 7/2009 | Hochart et al. |
| 2009/0208095 A1 | 8/2009 | Zebedin |
| 2009/0254229 A1 | 10/2009 | Nakamura |
| 2009/0259350 A1 | 10/2009 | Morris et al. |
| 2009/0304227 A1 | 12/2009 | Kennedy et al. |
| 2010/0042269 A1 | 2/2010 | Kokkeby et al. |
| 2010/0079267 A1 | 4/2010 | Lin |
| 2010/0121574 A1 | 5/2010 | Ariyur et al. |
| 2010/0204867 A1 | 8/2010 | Longstaff |
| 2010/0215212 A1 | 8/2010 | Flakes |
| 2010/0250022 A1 | 9/2010 | Hines et al. |
| 2010/0286859 A1 | 11/2010 | Feigh et al. |
| 2010/0296693 A1 | 11/2010 | Thornberry et al. |
| 2011/0033110 A1 | 2/2011 | Shimamura et al. |
| 2012/0143482 A1 | 6/2012 | Goossen et al. |
| 2012/0232722 A1 | 9/2012 | Fisher et al. |
| 2013/0162822 A1 | 6/2013 | Lee et al. |
| 2013/0216089 A1 | 8/2013 | Chen et al. |
| 2013/0246204 A1 | 9/2013 | Thornberry et al. |
| 2013/0262029 A1 | 10/2013 | Pershing |
| 2013/0277500 A1 | 10/2013 | Miller |
| 2013/0317667 A1 | 11/2013 | Kruglick |
| 2014/0018979 A1 | 1/2014 | Goossen et al. |
| 2014/0132635 A1 | 5/2014 | Murdoch et al. |
| 2014/0316614 A1 | 10/2014 | Newman |
| 2014/0316616 A1* | 10/2014 | Kugelmass ............ G08G 5/0039 701/8 |
| 2015/0022656 A1 | 1/2015 | Carr et al. |
| 2015/0225081 A1 | 8/2015 | Stabler et al. |
| 2015/0227645 A1 | 8/2015 | Childs et al. |
| 2015/0254738 A1 | 9/2015 | Wright et al. |
| 2016/0187882 A1 | 6/2016 | Downey et al. |
| 2016/0257424 A1 | 9/2016 | Stabler et al. |
| 2016/0285774 A1 | 9/2016 | Downey et al. |
| 2016/0307447 A1 | 10/2016 | Johnson et al. |
| 2016/0371984 A1* | 12/2016 | Macfarlane .......... G08G 5/0034 |
| 2017/0110014 A1* | 4/2017 | Teng ................... G08G 5/0086 |
| 2017/0154535 A1 | 6/2017 | Downey et al. |
| 2017/0192418 A1 | 7/2017 | Bethke et al. |
| 2017/0192424 A1 | 7/2017 | Poole et al. |
| 2017/0193297 A1 | 7/2017 | Michini et al. |
| 2017/0193829 A1 | 7/2017 | Bauer et al. |
| 2017/0199647 A1 | 7/2017 | Richman et al. |
| 2017/0242873 A1 | 8/2017 | Barrow et al. |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| EP | 2244150 A2 | 10/2010 |
| EP | 2685336 A1 | 1/2014 |

(56) References Cited

FOREIGN PATENT DOCUMENTS

| | | |
|---|---|---|
| ES | 2266704 T | 3/2007 |
| JP | 2003/317089 A | 11/2003 |
| MX | PA05004987 | 2/2006 |
| WO | WO99/18732 | 4/1999 |
| WO | WO/2000/053090 | 9/2000 |
| WO | WO/2004/044692 | 5/2004 |
| WO | WO/2005/088251 | 9/2005 |
| WO | WO/2008/028040 | 3/2008 |
| WO | WO2013/082280 A1 | 6/2013 |
| WO | WO2013/158202 A1 | 10/2013 |
| WO | WO 2015/102731 | 7/2015 |
| WO | WO 2016/131005 | 8/2016 |
| WO | WO 2017/116860 | 7/2017 |
| WO | WO2017/127711 A1 | 7/2017 |

OTHER PUBLICATIONS

Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava Jan. 27-30, 2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 Smpte Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in The Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/ Methods Application Group, Fort Collins, CO, pp. 1-6, at least as early as Jul. 30, 2006.
Norton-Griffiths et al., 1982, "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/ Archives/2000jan/00jan_tableofcontents.html, pp. 1-4, 2000.
Slaymaker, et al., "Cost-effective Determination of Biomass from Aerial Images", Lecture Notes In Computer Science, 1737:67-76, http://portal.acm.org/citation.cfm?id=648004.743267&coll=GUIDE &dl=, 1999.
Slaymaker, et al., "A System for Real-time Generation of Georeferenced Terrain Models", 4232A-08, SPIE Enabling Technologies for Law Enforcement Boston, MA, ftp://vis-ftp.cs.umass.edu/ Papers/schultz/spie2000.pdf, 2000.
Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers" Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.

(56) References Cited

OTHER PUBLICATIONS

Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "Gps and Inertial Navigation Delivering", Sep. 2005, GEOconnexion International Magazine, p. 52-53, Sep. 2005.
"POS AV" Applanix, Product Outline, airborne@applanix.com, 3 pages, Mar. 28, 2007.
Postrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9- 13, 1990.
Heipke, et al., "Test Goals and Test Set Up for the OREPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, "Mechanische Radialtriangulation mit Konvergentaufnahmen", Bildmessung und Luftbildwesen, 1958, Nr. 1.
Myhre, "ASPRS/ACSM/RT 92" Technical papers, Washington, D.C., vol. 5 Resource Technology 92, Aug. 3-8, 1992.

Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images, " Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al., Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
Dulo, Donna A.; "Unmanned Aircraft Classifications;" TheSciTechLawyer; vol. 11, No. 4, Summer 2015, American Bar Association.
Chesebro, Jonathan; "Unmanned Aircraft Systems (UAS)" [online website article] Retrieved from http://www.trade.gov/static/aero_rpt_flight_plan_2011_uas.pdf, [Retrieved May 19, 2015].
Brown et al.; "Unmanned Drones—Technical Elegance vs. Political Consequences;" TheSciTechLawyer; vol. 7, No. 1, Summer 2010, American Bar Association.
Cloar et al.; "Unmanned Aerial Systems: Mobility on the Edge;" TheSciTechLawyer; vol. 9, Nos. 3 & 4, Winter Spring 2013, American Bar Association; Retrieved from http://www.americanbar.org/publications/scitech_lawyer/2013/winter_spring_2013/unmanned_aerial_systems_mobility_on_the_edge.html [Retrieved Jun. 8, 2015].
Whitlock, Craig; "Close Encounters on Rise as Small Drones Gain in Popularity;" Jun. 23, 2014; The Washington Post; Retrieved from http://www.washingtonpost.com/sf/investigative/2014/06/23/close-encounters-with-small-drones-on-rise/ [Retrieved May 18, 2015].
Whitlock, Craig; "Crashes Mount as Military Flies More Drones in U.S.;" Jun. 22, 2014; The Washington Post; Retrieved from http://

(56) References Cited

OTHER PUBLICATIONS www.washingtonpost.com/sf/investigative/2014/06/22/crashes-mount-as-military-flies-more-drones-in-u-s/ [Retrieved May 18, 2015].
Drone Technology; "RPAS MCFLY-IR;" [Website] Retrieved from http://www.dronetechnology.eu/rpasmcflyir/ [Retrieved Jun. 15, 2015].
Johnson, Ted; "Filmmakers Get Permission to Use Drones in the U.S."; Variety; Sep. 25, 2014.
Curran, Oisin; "How Drone Cinematography Works"; [Online Article] Retrieved from http://entertainment.howstuffworks.com/dronecinematography5.htm/printable [Retrieved May 5, 2015].
Anonymous; "Know Before You Fly" Brochure; Retrieved from http://knowbeforeyoufly.org/wp-content/uploads/2015/12/KBYF_Brochure_WEB.pdf [Retrieved May 5, 2015].
Anonymous; "Know Before You Fly" Website; Retrieved from http://knowbeforeyoufly.org/about-us/ [Retrieved May 5, 2015].
Anonymous; LATAS Website; Retrieved from http://flylatas.com/ [Retrieved Jun. 2, 2015].
McKeever et al.; "Report of the Governor's Oklahoma Unmanned Aerial Systems Council"; Office of the Governor—State of Oklahoma; Spring 2012.
Calvo, Kike "So You Want to Shoot Aerial Photography Using Drones?"; Mar. 5, 2014; The National Geographic Society; Retrieved from http://voices.nationalgeographic.com/2014/03/05/soyouwant-toshootaerialphotographyusingdrones/ [Retrieved May 5, 2015].
Tomkins, Richard; "Drone Aviation receives order for aerostats"; UPI; May 6, 2015.
Whitlock, Craig; "When Drones Fall from the Sky;" Jun. 20, 2014; The Washington Post; Retrieved from http://www.washingtonpost.com/sf/investigative/ 2014/06/20/when-drones-fall-from-the-sky/ [Retrieved May 18, 2015].
King, Rachael; "Yamaha Waits for FAA Approval on Agricultural Drone"; CIO Journal; Oct. 16, 2014; Retrieved from http://blogs.wsj.com/cio/2014/10/16/yamahawaitsforfaaap-provalonagriculturaldrone/ [Retrieved May 19, 2015].
Hanlon, Mike; "Yamaha's RMAX—the worlds most advanced non-military UAV"; Jun. 4, 2004 updated Nov. 19, 2004; Gizmag; Retrieved from http://www.gizmag.com/go/2440/ [Retrieved May 19, 2015].
WIPO, International Search Report and Written Opinion regarding PCT App. No. PCT/US17/12696 mailed May 26, 2017.
Fathi, Habib; "Videogrammetric Roof Surveying Using a Hybrid Structure from Motion Approach"; Georgia Institute of Technology; Dec. 1, 2013; Retrieved from https://smartech.gatech.edu/handle/1853/52972 [Retrieved Dec. 1, 2017].
European Patent Office, Extended European Search Report regarding European Patent App. No. 3391164 dated Jul. 31, 2019.
Australian Government IP Australia, Examination Report No. 1 regarding Australian Patent Application No. 2017206097, dated Jun. 30, 2020.
IP Australia, Examination Report No. 1 regarding Australian Patent Application No. 2021245126, dated Nov. 17, 2022.
Pictometry International Corp., Response to Examination Report No. 1 regarding Australian Patent Application No. 2017206097, dated May 28, 2021.
IP Australia, Examination Report No. 2 regarding Australian Patent Application No. 2017206097, dated Jun. 8, 2021.
Pictometry International Corp., Response to Examination Report No. 2 regarding Australian Patent Application No. 2017206097, dated Jun. 11, 2021.
Pictometry International Corp., Response to Nov. 17, 2022, Examination Report No. 1 regarding Australian Patent Application No. 2021245126, dated Sep. 18, 2023.
Canadian Intellectual Property Office, Office Action regarding Canadian Patent Application No. 3,001,023, dated Jan. 26, 2023.
Pictometry International Corp., Response to Jan. 26, 2023 Office Action regarding Canadian Patent Application No. 3,001,023, dated May 26, 2023.
Canadian Intellectual Property Office, Office Action regarding Canadian Patent Application No. 3,001,023, dated Oct. 31, 2023.
Pictometry International Corp., Response to Oct. 31, 2023 Office Action regarding Canadian Patent Application No. 3,001,023, dated Feb. 29, 2024.

* cited by examiner

SYSTEMS AND METHODS FOR TAKING, PROCESSING, RETRIEVING, AND DISPLAYING IMAGES FROM UNMANNED AERIAL VEHICLES

CROSS-REFERENCE TO RELATED APPLICATIONS

The present patent application claims priority to, and is a divisional application of, the patent application identified by U.S. Ser. No. 15/401,999 and Publication No. U.S. 2017/0235018 A1, entitled "SYSTEMS AND METHODS FOR TAKING, PROCESSING, RETRIEVING, AND DISPLAYING IMAGES FROM UNMANNED AERIAL VEHICLES," filed on Jan. 9, 2017, which claims priority to provisional patent application identified by U.S. Ser. No. 62/276,539, filed on Jan. 8, 2016, entitled "Unmanned Aerial Systems and Methods of Using and Controlling Flight of Same," and to the provisional patent application identified by U.S. Ser. No. 62/413,483, filed on Oct. 27, 2016, entitled "Systems and Methods for Processing Images from Unmanned Aerial Vehicles," the entire contents of all of which are hereby incorporated herein by reference.

BACKGROUND

Unmanned aerial systems (UAS) typically include unmanned aerial vehicles (UAV) that do not carry a human operator, but instead operate partially or completely autonomously and/or are remotely piloted.

Unmanned aerial vehicles may be used to capture images from one or more onboard image capture device and/or capture sensor data from one or more onboard sensor. In some unmanned aerial systems, the images or sensor data may have embedded metadata. In other unmanned aerial systems, metadata from the time the images or sensor data were taken may be available separately from the unmanned aerial system or from an outside source. However, the format and content type of the images, sensor data, and metadata vary widely depending on the type of unmanned aerial vehicle and/or unmanned aerial system. The form of transmission of the images, sensor data, and metadata also varies widely from system to system.

Therefore, methods and systems are needed to address processing images and accompanying data sourced from diverse unmanned aerial vehicles. Additionally, there is a need for systems and methods to retrieve aerial image and/or sensor data based on the metadata.

DETAILED DESCRIPTION OF EXEMPLARY EMBODIMENTS

Figure 1:
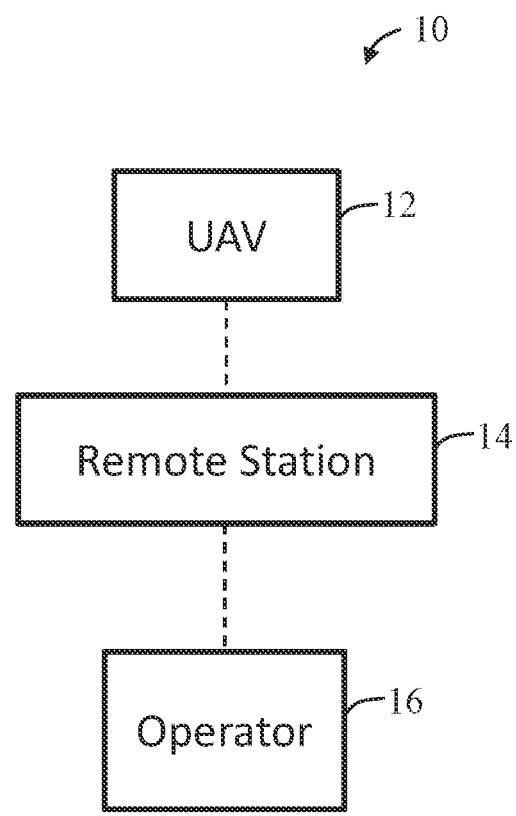
FIG. 1 is a block diagram of an exemplary embodiment of an unmanned aerial system in accordance with the present disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In one embodiment in accordance with the present disclosure, a method for capturing aerial images comprises: determining, with at least one of a controller of an unmanned aerial vehicle and a processor of a remote station, a flight plan of the unmanned aerial vehicle, the flight plan configured such that the unmanned aerial vehicle and fields of view of an image capture device of the unmanned aerial vehicle are restricted to an area within boundaries of a geographic location identified by coordinates of the geographic location; and executing, with the unmanned aerial vehicle, the flight plan; and capturing, with the image capture device, one or more aerial images solely within the boundaries of the geographic location while executing the flight plan.

In one embodiment, executing the flight plan is carried out automatically by the controller of the unmanned aerial vehicle.

In one embodiment, executing the flight plan is at least partially carried out by an operator utilizing the human-machine interface module of the remote station, and further comprising: receiving, by the remote station from the communications system, one or more first non-transitory signal indicative of position of the unmanned aerial vehicle; and transmitting, from the remote station to the communications system of the unmanned aerial vehicle, one or more second non-transitory signal indicative of instructions for navigation of the unmanned aerial vehicle to maintain the unmanned aerial vehicle within the boundaries.

In one embodiment, a method comprises receiving aerial images captured by one or more unmanned aerial vehicle; receiving metadata associated with the aerial images captured by the one or more unmanned aerial vehicle; geo-referencing the aerial images based at least in part on a geographic location of a surface to determine geographic coordinates of pixels of the aerial images; receiving a geographic location from a user; retrieving one or more of the aerial images associated with the geographic location based on the determined geographic coordinates of the pixels; and displaying to the user one or more overview image depicting the geographic location and overlaid with one or more icons indicative of and associated with the retrieved aerial images associated with the geographic location.

In one embodiment, the metadata includes orientation, attitude, and bearing of one or more image capture device that captured the one or more aerial image, and wherein geo-referencing the aerial images based at least in part on a geographic location of a surface to determine geographic coordinates is geo-referencing the aerial images based at least in part on a geographic location of a surface and using the orientation, attitude, and bearing of the image capture device to determine the geographic coordinates of objects depicted in the one or more aerial image.

In one embodiment, the method further comprises receiving a selection from the user of one of the icons; and displaying the retrieved aerial image associated with the icon. The geographic location from the user may be in a form of three or more geographic points forming a polygon.

The method may further comprise creating a three dimensional polygon based on the polygon and a predetermined height dimension; wherein retrieving one or more of the aerial images associated with the geographic location based on the determined geographic coordinates further comprises retrieving one or more of the aerial images associated with the geographic location based on the three dimensional polygon.

In one embodiment, a method comprises receiving aerial images captured by one or more image capture device on one or more unmanned aerial vehicle, the aerial images depicting only objects above the ground; receiving metadata associated with the one or more image capture device at the time the aerial images were captured, the metadata including latitude and longitude of the one or more image capture device and one or more of altitude, orientation, attitude, and bearing of the one or more image capture device; receiving information indicative of a location of a region of interest; and geolocating one or more of the aerial images, thereby associating one or more of the geolocated aerial images with the region of interest. Geolocating the one or more aerial images may be based at least in part on correlating the information indicative of the location of the region of interest and the metadata associated with the one or more image capture device at the time the aerial images were captured.

In one embodiment, the metadata associated with the one or more image capture device may further include one or more of sensor size of the one or more image capture device, focal length of the one or more image capture device; pixel pitch of the one or more image capture device, and distortion parameters of the one or more image capture device.

In one embodiment, a method comprises receiving aerial images captured by one or more unmanned aerial vehicle and time data indicative of a time the aerial images were captured; receiving metadata captured by the one or more unmanned aerial vehicle including time data indicative of when the metadata was captured; associating the metadata with the aerial images based at least in part on matching the time data of the metadata with the time data of the aerial images; geo-referencing the aerial images based on a geographic location of a surface to determine geographic coordinates of pixels for ground locations and objects depicted in the aerial images; receiving a geographic location from a user; retrieving one or more of the aerial images associated with the geographic location based on the determined geographic coordinates; and displaying to the user one or more overview image depicting the geographic location and overlaid with one or more icons indicative of and associated with the retrieved aerial images associated with the geographic location.

In one embodiment, a method comprises receiving non-standardized metadata captured by an unmanned aerial vehicle and associated with one or more image captured by the unmanned aerial vehicle; transforming the non-standardized metadata into a standardized format; and storing the transformed metadata in a first database associated with the one or more image stored in a second database.

In one embodiment, a method comprises determining, with at least one of a controller of an unmanned aerial vehicle and a processor of a remote station, a flight plan of the unmanned aerial vehicle, the flight plan configured such that the unmanned aerial vehicle and fields of view of an image capture device of the unmanned aerial vehicle are restricted to an area within boundaries of a geographic location identified by coordinates of the geographic location; executing, with the unmanned aerial vehicle, the flight plan; and capturing, with the image capture device, one or more aerial images solely within the boundaries of the geographic location and restricted to fields of view in within the boundaries while executing the flight plan. Executing the flight plan may be carried out automatically by the controller of the unmanned aerial vehicle. Executing the flight plan may be at least partially carried out by an operator utilizing a human-machine interface module of the remote station, and further comprise receiving, by the remote station, one or more first non-transitory signal indicative of position of the unmanned aerial vehicle; and transmitting, from the remote station to a communications system of the unmanned aerial vehicle, one or more second non-transitory signal indicative of instructions for navigation of the unmanned aerial vehicle to maintain the unmanned aerial vehicle within the boundaries.

In one embodiment, a method comprises receiving aerial images captured by one or more unmanned aerial vehicle; receiving metadata associated with the aerial images captured by the one or more unmanned aerial vehicle; geo-referencing the aerial images based at least in part on a geographic location of a surface to determine geographic coordinates of pixels of the aerial images; receiving a geographic location from a user based on selection by the user of one or more pixels of a first one of the aerial images, the geographic location being above the ground; and retrieving one or more of second ones of the aerial images associated with the geographic location from the user based on the determined geographic coordinates of the pixels.

In one embodiment, the geographic location from the user may be in a form of three or more geographic points based on selection by the user of three or more pixels forming a polygon of the first one of the aerial images.

In one embodiment, the first one of the aerial images may include a depiction of a structure and the geographic location from the user in the form of three or more geographic points forming a polygon may be located on the structure in the first on of the aerial image.

In one embodiment, the first one of the aerial images may include a depiction of a structure and the geographic location from the user in in a form of one or more elements of the structure chosen by the user in the first on of the aerial image.

In one embodiment, the one or more elements of the structure may be chosen from the group consisting of a wall, a roof plane, a roof, a floor, a door, an intersection, a cross-section, and a window.

Figure 2:
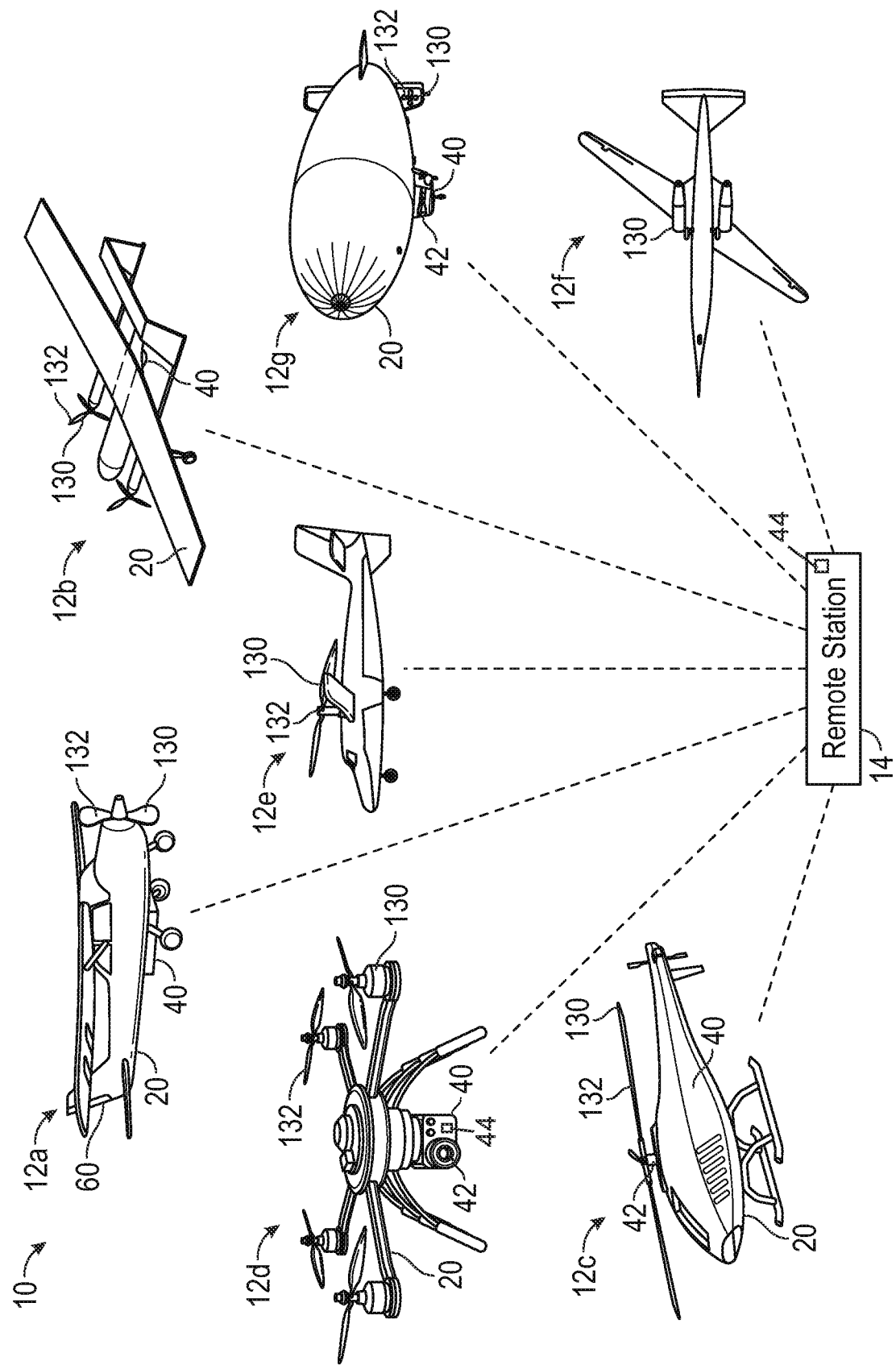
FIG. 2 is a perspective view of an exemplary embodiment of an unmanned aerial system in accordance with the present disclosure.

Referring now to the drawings, FIG. 1 is a block diagram of an exemplary embodiment of an unmanned aerial system (UAS) 10 in accordance with the present disclosure. The UAS 10 may comprise one or more Unmanned Aerial Vehicle (UAV) 12. In some embodiments the UAS 10 may further comprise one or more remote station 14. In one embodiment, one or more remote operator 16 may interact with the remote station 14. The remote station 14 may serve a range of functions, from simply receiving data from the UAV 12, up to and including completely controlling all functions of the UAV 12. Further, it will be understood that the UAS 10 may comprise a plurality of UAVs 12 and/or a plurality of remote stations 14, working in pairs separately, or working together in any combination, for example, as shown in FIG. 2. The UAS 10 may comprise two or more UAVs 12 working in tandem and/or independently.

In one embodiment, the UAS 10 may comprise a transponder system (not shown) configured for transmitting signals to other aircraft, the signals comprising information regarding the UAS 10 and/or location of the UAS 10 or UAV 12. The transponder system may be located partially or completely in one or both of the UAV 12 and the remote station 14.

Figure 3:
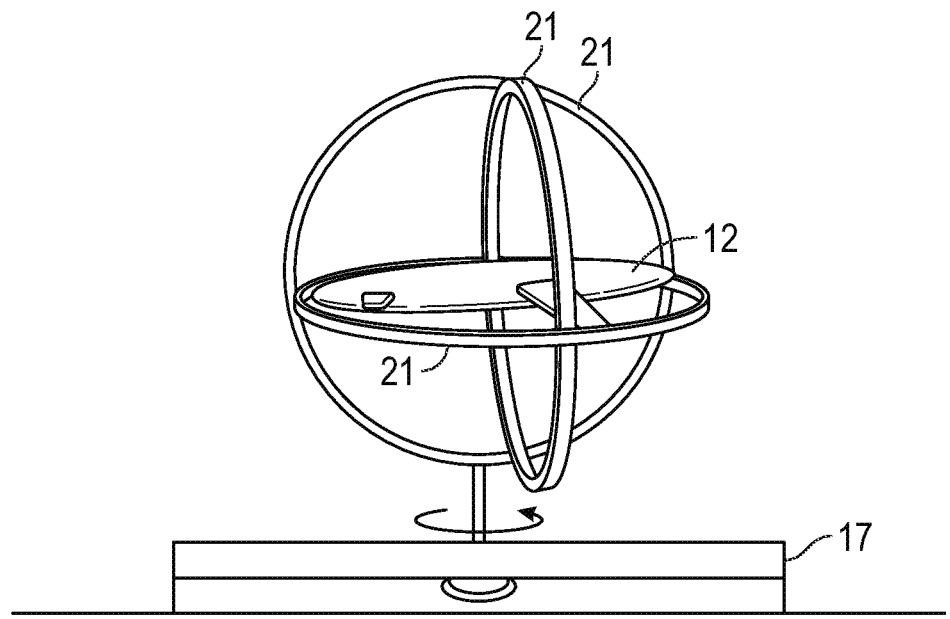
FIG. 3 is an illustration of another exemplary embodiment of an unmanned aerial system in accordance with the present disclosure.

In one embodiment, as illustrated in FIG. 3, the UAS 10 may further comprise a case 17. The case 17 may be used to store and transfer the UAV 12 and/or the remote station 14. Additionally, or alternately, the case 17 may be part of the remote station 14. Additionally, or alternately, the case 17 may be used as part of pre-flight check(s). For example, the case 17 may be used to weigh down the UAV 12 for a power-up check and provide targets for a collision detection diagnostic phase.

The case 17 may also contain actuators (not shown) to move the UAV 12 on the various axes to test how the UAS 10 reacts to changes in attitude. As one non-exclusive example, the UAV 12 is secured to the case 17 such that the UAV 12 may be moved to allow roll, pitch, and yaw. The UAV 12 may be connected to the case 17 via one or more gimbal 21, a nested gimbal, and/or a gimbal lock. A gimbal lock restricts one degree of freedom in a multi-dimensional, multi-gimbal mechanism having "n" gimbals and thus "n" degrees of freedom. The gimbal lock restricts the axes of "n-1" gimbals. For example, in a three-gimbal system, two of the three gimbals are driven into a parallel configuration, "locking" the system into rotation in a degenerate two-dimensional space.

In one embodiment, multiple servos and/or motors may rotate the UAV 12 across each degree of freedom (roll, pitch, and yaw) in a series of tests to verify that the correct power is provided to the correct component of the UAV 12 to compensate for the motion, thereby testing flight-worthiness of the UAV 12.

Figure 4:
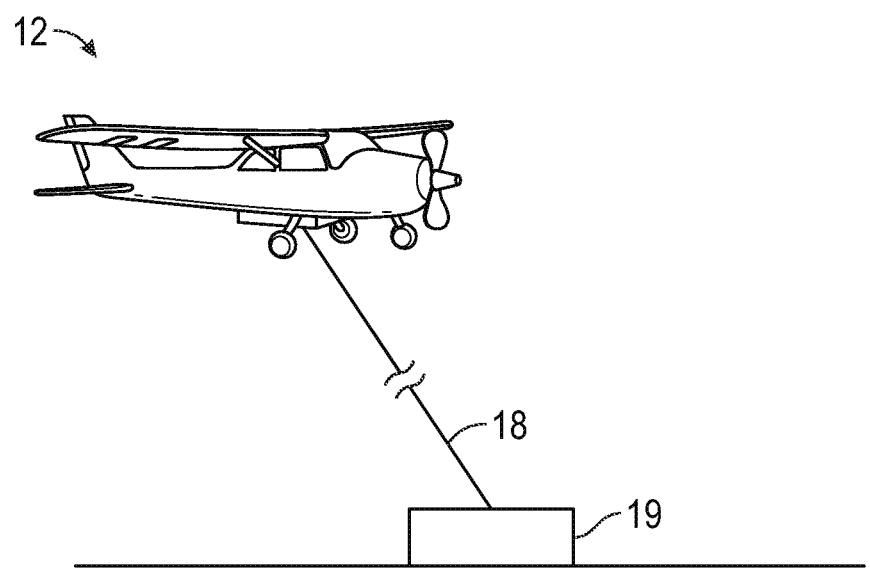
FIG. 4 is an illustration of yet another exemplary embodiment of an unmanned aerial system in accordance with the present disclosure.

As illustrated in FIG. 4, in one embodiment, the UAS 10 may further comprise a tether 18 for tethering the UAV 12 to a base 19. In one embodiment, the remote station 14 and/or the case 17 may act as the base 19. In one embodiment, power may be provided through the tether 18 using step up/step down transformers (not shown).

In one embodiment, the UAS 10 may employ software-based distance and/or altitude limits to limit and/or control the use of the UAV 12 to a control range. For example, the operator 16 may set a maximum distance limit in the UAV 12 and/or the remote station 14 so the UAV 12 will not go beyond the control range. And/or the operator 16 may set a maximum above ground limit in the UAV 12 and/or remote station 14 so the UAV 12 will not go above a set altitude, for example 400 feet above the ground. In one embodiment, the maximum altitude limit is set based on Federal Aviation Administration rules. For example, the remote station 14 and/or the UAV 12 may be programmed with data indicative of a particular type of air space and to restrict the use of the UAV 12 to that particular type of air space. For example, the particular type of air space could be "class G" air space to substantially prevent the UAV 12 from interfering with air craft in another type of air space (such as other air space classes).

In one embodiment, the UAV 12 may automatically return to a predetermined home location and/or to the remote station 14 if there is a failure. For example, if components of the UAV 12 fail or if the signal from the remote station 14 fails, the UAV 12 may automatically return to the home location and/or to the remote station 14.

Figure 5:
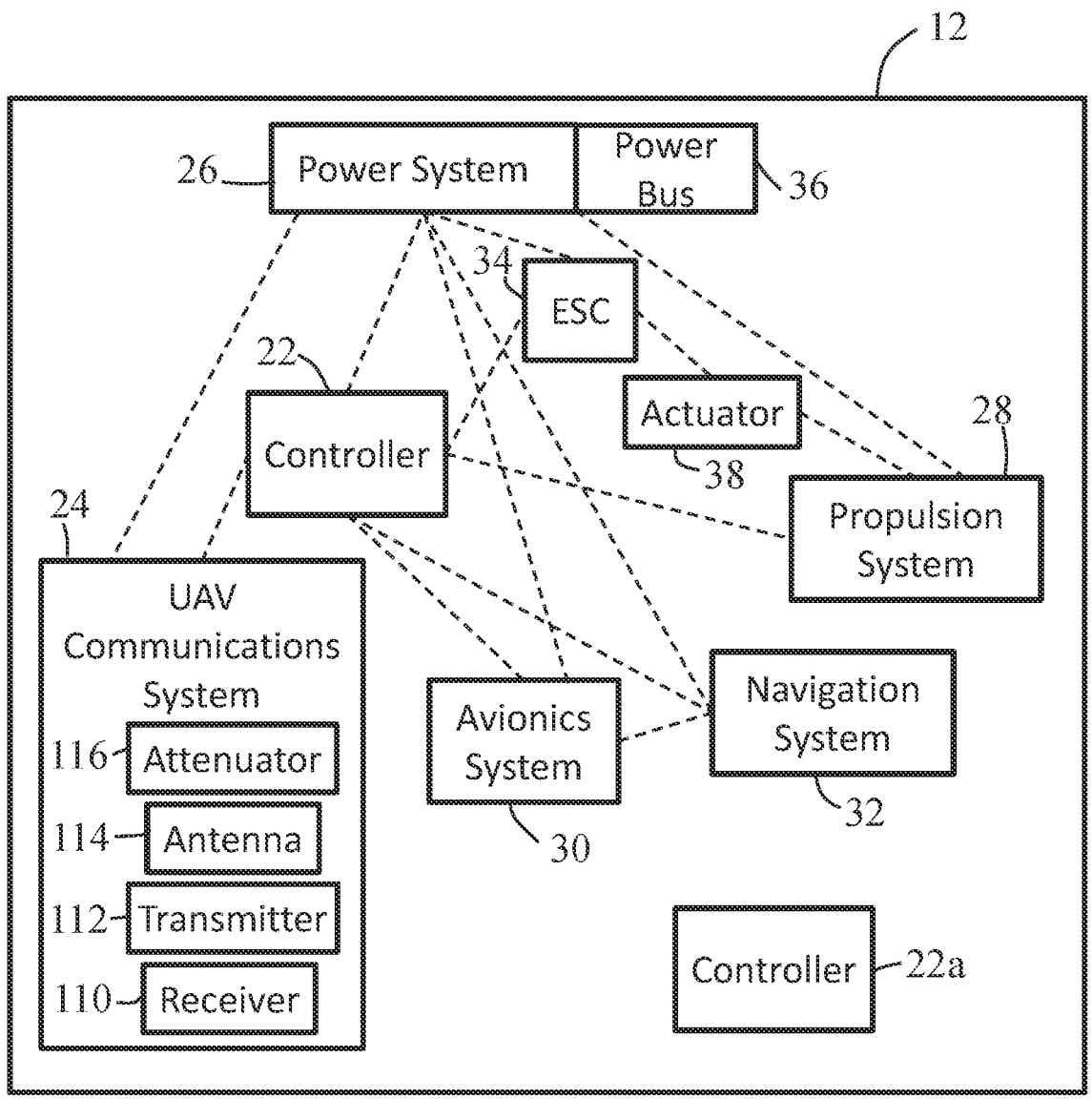
FIG. 5 is a block diagram of an exemplary embodiment of an unmanned aerial vehicle in accordance with the present disclosure.
Figure 18:
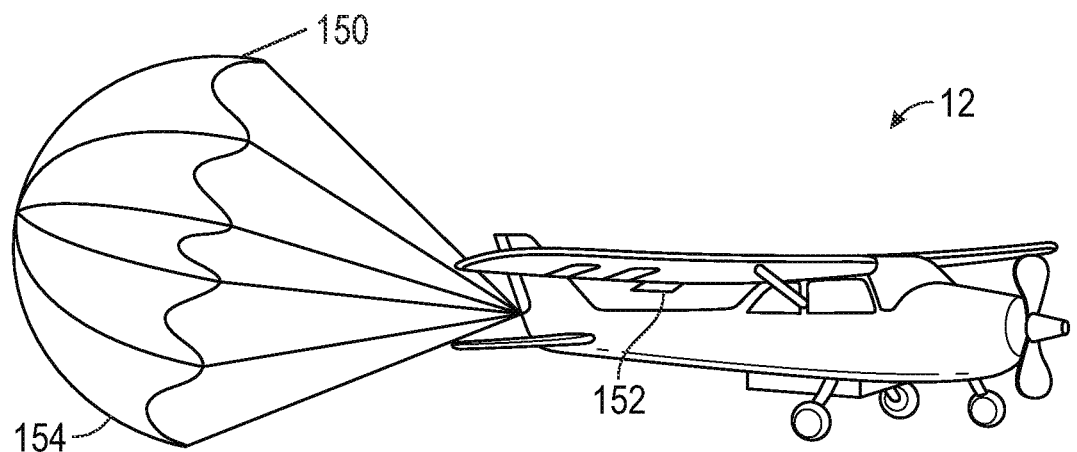
FIG. 18 is an illustration of exemplary embodiments of unmanned aerial vehicles in accordance with the present disclosure.
Figure 18:
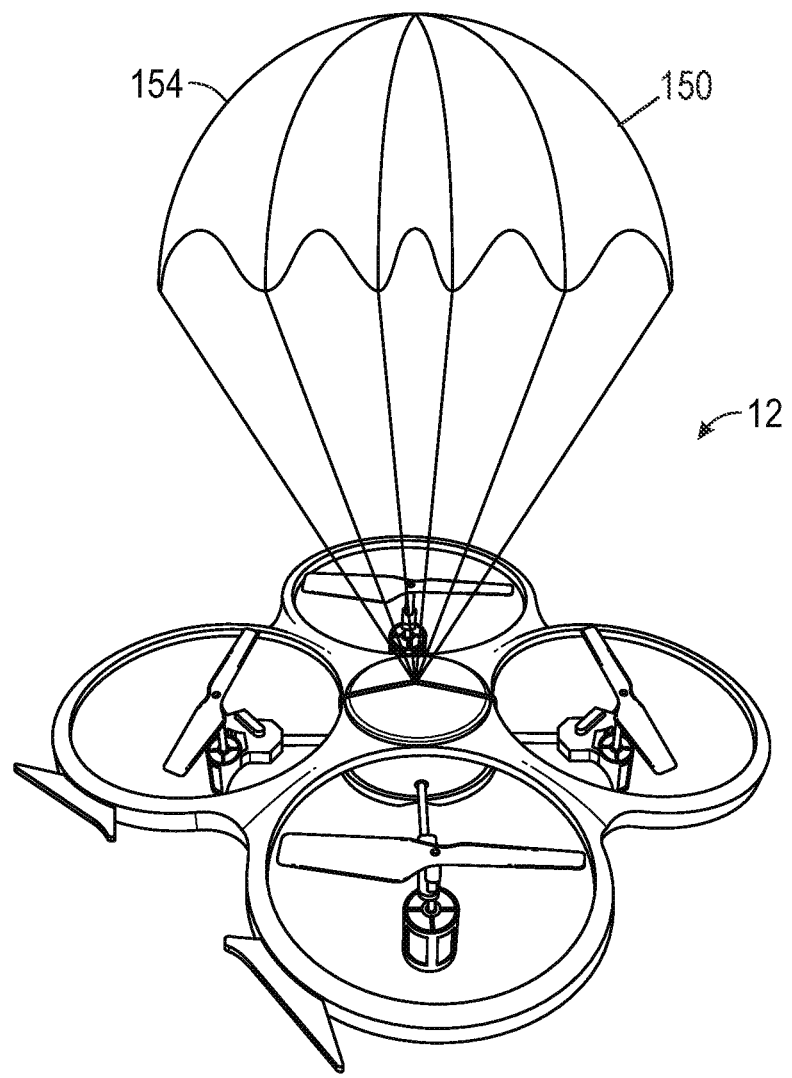

UAV 12:

As shown in FIGS. 2 and 5, the UAV 12 may comprise an airframe 20, a controller 22, a communications system 24, a power system 26, a propulsion system 28, and an avionics system 30. In some embodiments, the UAV 12 may comprise a navigation system 32, or the navigation system 32 may be partially or completely in the remote station 14. In some embodiments, the UAV 12 may comprise one or more Electronic Speed Control (ESC) 34. In some embodiments, the UAV 12 may comprise one or more power bus 36. In one embodiment, the UAV 12 may comprise one or more speed reduction device 150 (for example, as shown in FIG. 18). In some embodiments, the UAV 12 may comprise one or more actuator 38.

The UAV 12 may carry a payload 40. In one embodiment, components of the UAV 12 are sized and specified to safely carry the weight of the desired payload 40 and to meet specifications to withstand wind forces and to reduce the weight of the UAV 12. Additionally, since the weight of the UAV 12 is related to the kinetic energy of the UAV 12, a UAV 12 with a reduced weight has less kinetic energy than a heavier weight UAV 12, and therefore minimizes damage in the event of a crash of the UAV 12.

The UAV 12 may comprise one or more image capture device 42 and/or may carry one or more image capture device 42 as part of the payload 40. Nonexclusive examples of image capture devices 42 include cameras (capable of detecting visible and non-visible ranges of light), infrared sensors, radar, and sonar. The image capture device 42 may capture images 44. The UAV 12 may transmit the images 44 to the remote station 14 and/or to a remote system (not shown), and/or store the images 44, and/or process (partially or fully) the images 44 onboard the UAV 12. Nonexclusive examples of processing the images 44 may include partially or completely georeferencing one or more images 44, geo-locating one or more images 44, reviewing one or more images 44 for abnormalities, performing quality control of one or more images 44, tie-pointing (manual/automatic) to relate adjacent images 44, bundle adjustments, 3D point cloud generation from 2D images 44, mosaic generation from the images 44, and/or color-balancing one or more images 44.

Figure 6:
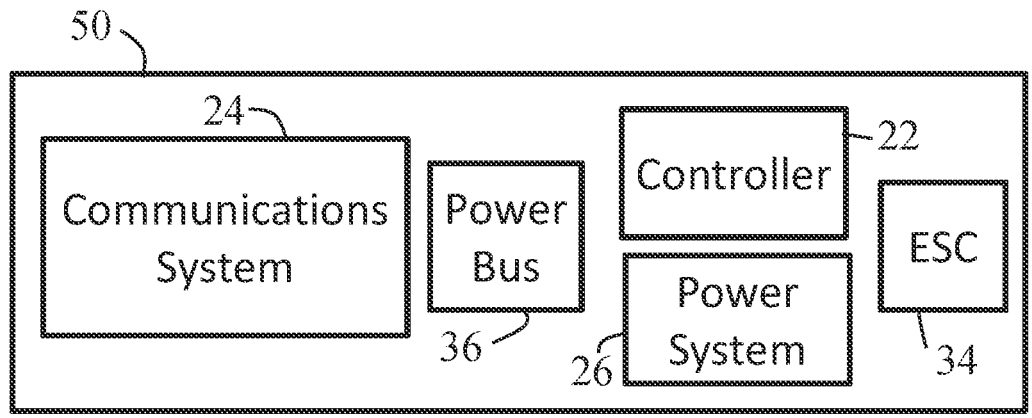
FIG. 6 is a block diagram of an exemplary embodiment of integrated components of an unmanned aerial vehicle in accordance with the present disclosure.

In one embodiment, components of the UAV 12 may be tightly integrated to reduce size and weight of the UAV 12. For example, as illustrated in FIG. 6, the controller 22, the communications system 24, the ESCs 34, the power bus 36, and/or components of the power system 26 (e.g., motors) may be integrated into one or more printed circuit board (PCB) 50 or a hybrid PCB and integrated circuit. Wires may be substituted with PCB traces, thus reducing or eliminating the number of wires and connectors required.

Figure 7:
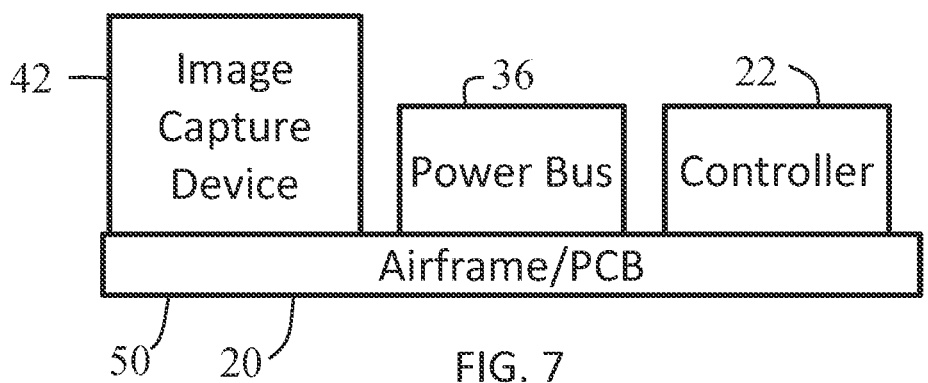
FIG. 7 is a block diagram of another exemplary embodiment of integrated components of an unmanned aerial vehicle in accordance with the present disclosure.

Additionally, or alternately, all or some of the payload 40, for example, the image capture device 42, may be integrated on one or more shared PCB 50, as shown in FIG. 7, for example, with the power bus 36 and/or controller 22.

Figure 8:
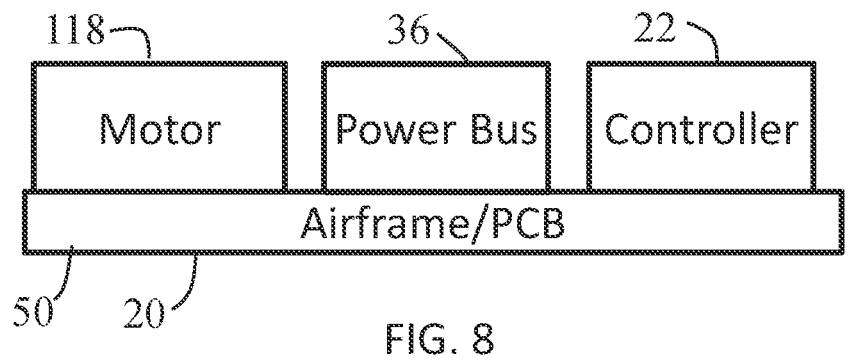
FIG. 8 is a block diagram of yet another exemplary embodiment of integrated components of an unmanned aerial vehicle in accordance with the present disclosure.

In one embodiment, as shown in FIG. 8, components of the power system 26 may be mounted directly to the PCB 50, along with other components, such as the power bus 36 and/or the controller 22. Additionally, or alternately, wires may be used to connect the power system 26 to the Electronic Speed Controls 34.

UAV Airframe 20:

Returning to FIG. 2, it will be understood that any type of aircraft airframe may be used as the basis of the airframe 20 of the UAV 12. Non-exclusive examples of types of UAVs 12 having different airframes 20 include a fixed-wing UAV 12a having a front or rear propeller, a fixed-wing UAV 12b having multiple wing propellers, a helicopter type UAV 12c, a multi-rotor UAV 12d, a tilt-rotor UAV 12e, a jet-type UAV 12f, and a blimp-type UAV 12g. In one embodiment, the airframe 20 of the UAV 12g may have a blimp-like design in which the airframe 20 encloses lighter-than-air gas.

The airframe 20 of the UAV 12 may have one or more control surfaces 60 such as elevators, rudders, flaps, slats, and/or ailerons. The control surfaces 60 may have one or more servomechanism (not shown).

The airframe 20 of the UAV 12 may have attachments to carry the payload 40 and/or the payload 40 may be integrated into the airframe 20 of the UAV 12.

In one embodiment, the PCB 50 may also form a section of the airframe 20.

Figure 9:
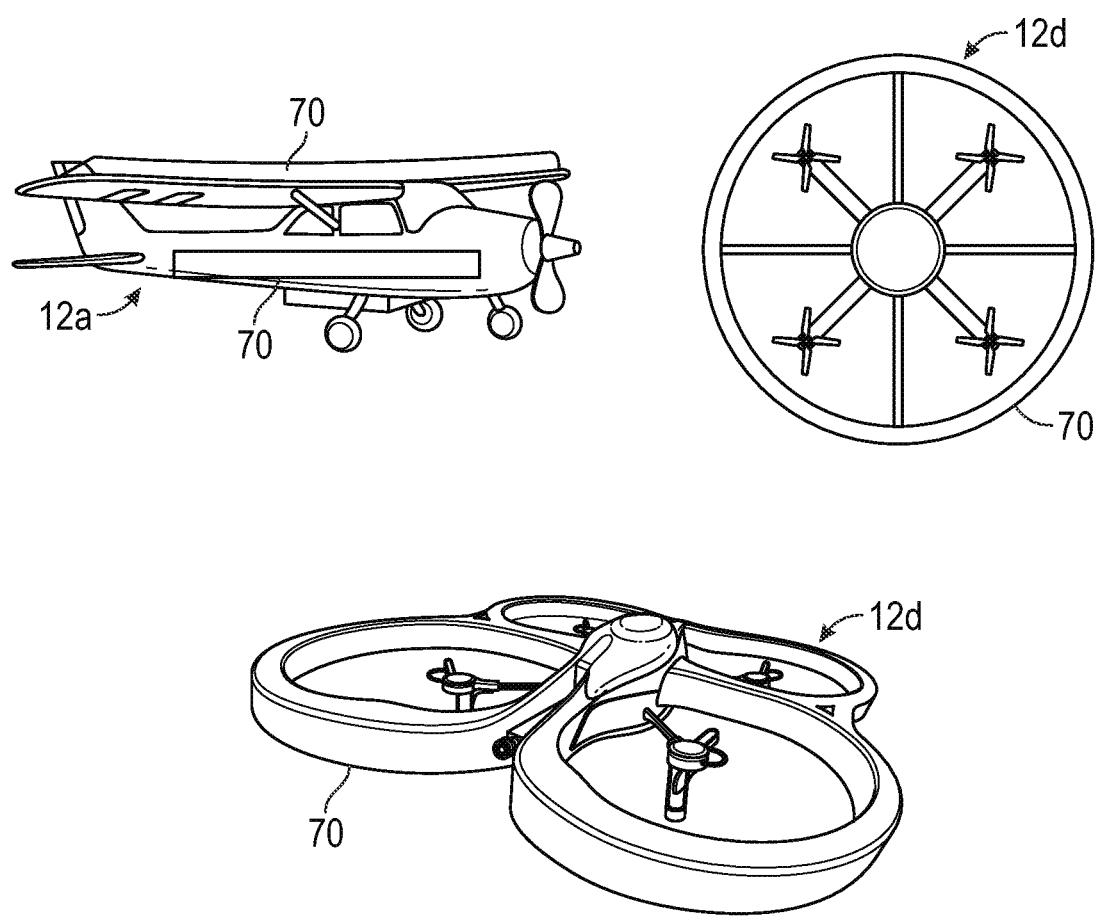
FIG. 9 is an illustration of an exemplary embodiment of multiple unmanned aerial vehicles in accordance with the present disclosure.

The airframe 20 may be configured to absorb energy, such as energy generated in a collision. In one embodiment, as illustrated in FIG. 9, the airframe 20 may include padding 70 that meets OSHA 1910.135b and the cited ANSI requirements for head protection. The padding 70 may substantially cover one or more exterior surfaces of the airframe 20. The padding 70 may be formed of foam or other appropriate padding material. In one embodiment, the airframe 20 is completely or partially composed of foam or other appropriate padding material.

Figure 10:
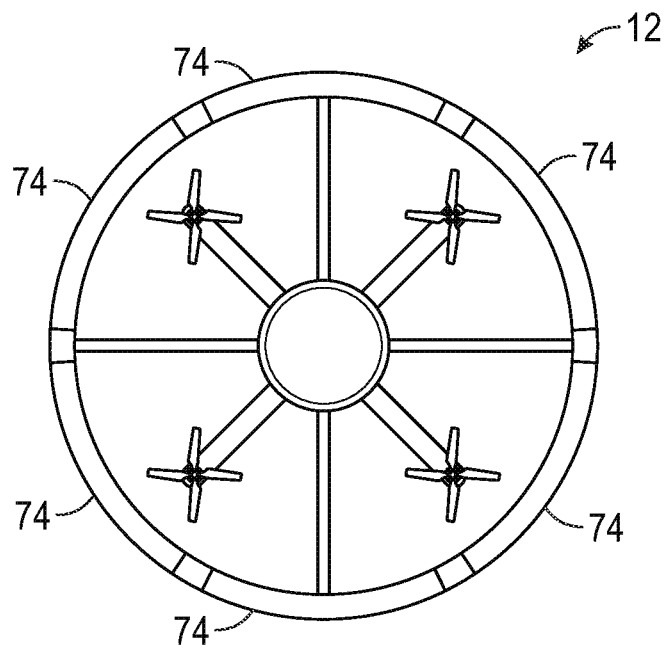
FIG. 10 is an illustration of an exemplary embodiment of yet another unmanned aerial vehicle in accordance with the present disclosure.
Figure 11:
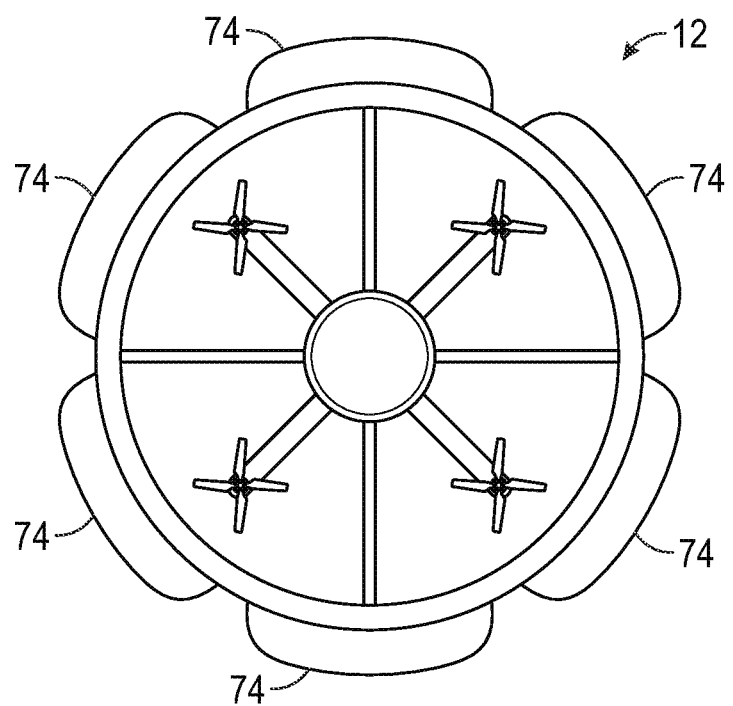
FIG. 11 is an illustration of the unmanned aerial vehicle of FIG. 10 in which air bladders are deployed.
Figure 12:
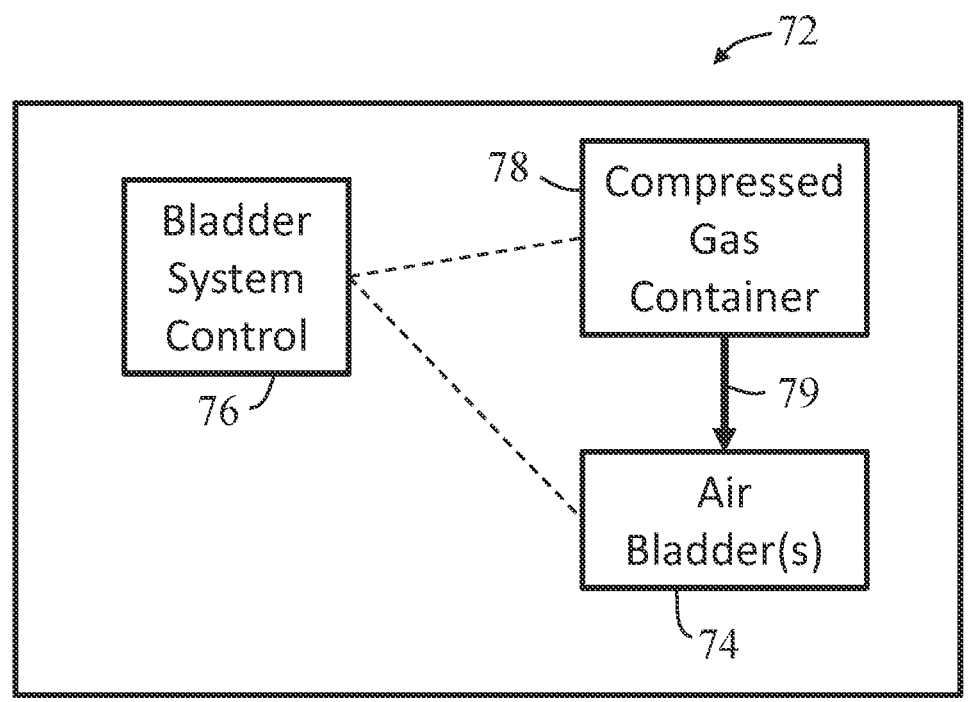
FIG. 12 is a block diagram of an exemplary embodiment of a bladder system in accordance with the present disclosure.

In one embodiment, as illustrated in FIGS. 10-12, the airframe 20 may include a bladder system 72 having air bladders 74. The air bladders 74 may substantially cover the airframe 20. The air bladders 74 may weigh less than padding 70.

In one embodiment, the air bladders 74 may have an un-inflated state (FIG. 10) and an inflated state (FIG. 11). In the inflated state, the air bladders 74 may encompass all or part of an exterior of the UAV 12 to protect the UAV 12 from impact with other objects, as well as to protect other objects from impact with the UAV 12. The air bladders 74 may be automatically and/or manually (remotely) switched to the inflated state if the UAV 12 is out of control. In one embodiment, the controller 22 may monitor the power system 26, the propulsion system 28, the avionics system 30, and/or the navigation system 32. If the controller 22 determines the UAV 12 is outside of predetermined parameters for one or more of the systems, the controller 22 may signal the air bladder system 72 to switch the air bladders 74 to the inflated state from the uninflated state. In one embodiment, the air bladders 74 may be automatically triggered to the inflated state when power is lost to one or more of the systems in the UAV 12.

In one embodiment, as shown in FIG. 12, the bladder system 72 may comprise one or more air bladders 74, a bladder system control 76, and one or more containers 78 containing compressed gas 79. The air bladders 74 may be inflated with the compressed gas 79 from the containers 78 by the bladder system control 76. The air bladders 74 may be automatically and/or manually (remotely) switched to the inflated state if the UAV 12 is out of control, via the bladder system control 76. In one embodiment, the bladder system control 76 may monitor the power system 26, the propulsion system 28, the avionics system 30, and/or the navigation system 32. If the bladder system control 76 determines the UAV 12 is outside of predetermined parameters for one or more of the systems, the bladder system control 76 may signal the air bladder system 72 to switch the air bladders 74 to the inflated state from the uninflated state.

In one embodiment, the airframe 20 may include both padding 70 and air bladders 74.

In one embodiment, sections of, or all of, the airframe 20 may be designed to break apart or compress on impact to help absorb the energy of a collision. This might include spring loading, gas loading, compressible materials, or weak points in the airframe 20 that are meant to break and/or collapse during a collision.

Figure 13:
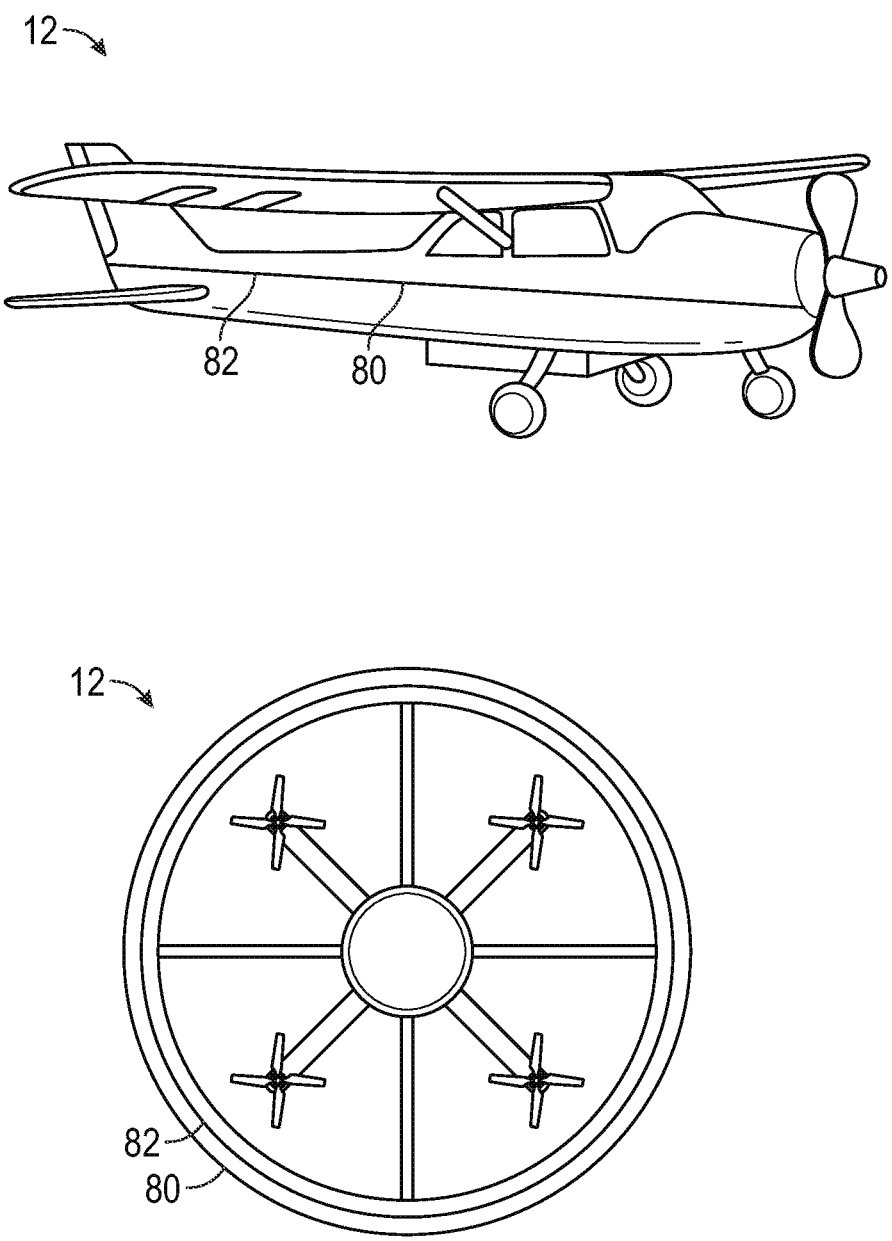
FIG. 13 is an illustration of exemplary embodiments of unmanned aerial vehicles having closed loop sensors in accordance with the present disclosure.

As illustrated in FIG. 13, in one embodiment, the UAV 12 may comprise a closed loop sensor 80 surrounding at least a portion of the airframe 20. The closed loop sensor 80 comprises an electrical circuit 82 surrounding at least a portion of the airframe 20. The closed loop sensor 80 works to signal the controller 22 if there is a break in the electrical circuit 82. For example, if the airframe 20 is damaged or is in a collision, there is a disruption in the electrical circuit 82 of the closed loop sensor 80, and the controller 22 and/or the remote station 14 receive a signal indicating the airframe 20 has been compromised. Then the controller 22 and/or the remote station 14 may shut down the power system 26 and/or emit a warning to the remote operator 16 and anyone in the vicinity. The warning may be in any form, non-exclusive examples of which are an audible and/or visual warning.

Figure 14:
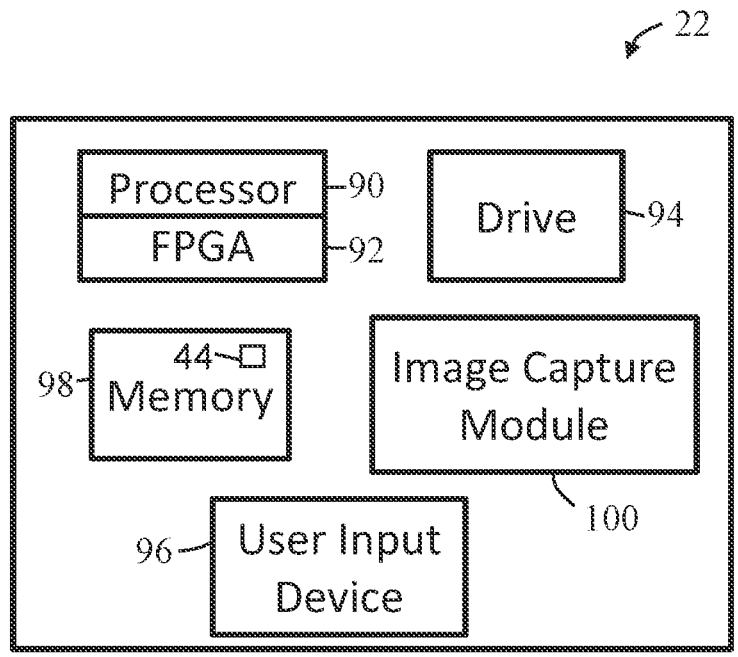
FIG. 14 is a block diagram of an exemplary embodiment of a controller of an unmanned aerial vehicle in accordance with the present disclosure.

UAV Controller 22:

Turning now to FIG. 14, a block diagram of an exemplary controller 22 is shown. The controller 22 may control the functions of, and/or receive data from, the communications system 24, the power system 26, the propulsion system 28, the avionics system 30, the navigation system 32, and/or the ESC(s) 34. In one embodiment, the controller 22 may use data from the avionics system 30 or elsewhere (for example, an airspeed sensor, one or more down facing camera, GPS speed, etc.) to detect and limit the speed of the UAV 12. In one embodiment, the controller 22 may contain a maximum speed setting and/or altitude setting for the UAV 12.

In one embodiment, the controller 22 may include one or more computer processor 90 and/or field-programmable gate array (FPGA) 92, one or more drive 94, one or more user input device 96, and one or more non-transitory memory 98. In one embodiment, the controller 22 may have an image capture module 100.

The computer processors 90 and/or FPGAs 92 may be programmed or hardwired to control the UAV 12 and/or to interpret and carry out commands from the remote station 14 to control the UAV 12. In one embodiment, the controller 22 may be configurable to perform specific in-flight functions. The controller 22 may receive flight control instructions from the remote station 14 (or elsewhere), control relevant flight control mechanisms (such as through the power system 26, propulsion system 28, navigation system 32, and/or avionics system 30), and/or provide feedback information (e.g., telemetry information) to the remote station 14 and/or other device(s).

The drives 94 and their associated computer storage media such as removable storage media (e.g., CD-ROM, DVD-ROM) and non-removable storage media (e.g., a hard drive disk), may provide storage of computer readable instructions, data structures, program modules and other data. The drives 94 may store and include an operating system, application programs, program modules, and one or more database storing various data, nonexclusive examples of which include image data, position data, flight control instructions data, flight path data, past flight data, sensor data, and navigation data.

The controller 22 further may include one or more user input device 96, through which a user may enter commands and data. Non-exclusive examples of input devices 96 may include an electronic digitizer, a microphone, a keyboard, and a pointing device such as a mouse device, trackball device or touch pad device. Other input devices 96 may include a joystick device, game pad device, satellite dish, scanner device, or the like.

In one embodiment, the controller 22 may stream data (live or delayed feed) utilizing the communications system 24 to the remote station 14, or other site(s) or vehicle(s), and/or may store data in the one or more non-transitory memory 98. In data streaming applications, the controller 22 may transmit real-time video or data to the remote station and/or to points worldwide. The UAV 12 may have Internet connectivity (for example, through an Inmarsat satellite) and may transmit data directly over the Internet.

In some embodiments, the image capture module 100 may transmit captured images 44 to the remote station 14 or other device through the communication system 24, store the captured images 44 in the memory 98, and/or process the captured images 44. Non-exclusive examples of processing of captured images are described in U.S. Pat. No. 8,477,190, issued Jul. 2, 2013, titled "Real-Time Moving Platform Management System;" U.S. Pat. No. 8,385,672, issued Feb. 26, 2013, titled "System for Detecting Image Abnormalities;" U.S. Pat. No. 7,424,133, issued Sep. 9, 2008, titled "Method and Apparatus for Capturing, Geolocating and Measuring Oblique Images;" and U.S. Patent Publication US20150221079A1, published Aug. 6, 2015, titled "Augmented Three Dimensional Point Collection of Vertical Structures;" all of which are hereby incorporated by reference in their entirety herein.

The image capture module 100 and/or the remote station 14 may also be used to adjust operational parameters, such as resolution, of the image capture device 42. For example, the image capture module 100 and/or the remote station 14 may transmit one or more signal to the image capture device 42 indicating a change to operational parameters.

The memory 98 of the controller 22 may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the controller or the remote station or other remote processor. Any such computer storage media may be part of the controller 22 and/or the remote station 14.

In one embodiment, the controller 22 may automatically mitigate unexpected flight characteristics. Nonexclusive examples of unexpected flight characteristics include a ground effect (that is, increased lift-force and decreased aerodynamic drag that wings or rotors generate when they are close to a fixed surface), translational lift (i.e., a transitional state present after a helicopter has moved from hover to forward flight), and vortex ring state (i.e., settling with power, in which a rotary UAV 12 settles into its own downwash causing loss of lift). The controller 22 may monitor the power system 26, propulsion system 28, navigation system 32, and/or avionics system 30, to detect unexpected flight characteristics. After detection, the controller 22 may implement counter measures to the detected unexpected flight characteristics, such as sending one or more non-transitory signals to the power system 26, propulsion system 28, navigation system 32, and/or avionics system 30, to control the flight of the UAV 12.

UAV Electronic Speed Controls 34 and Actuators 38:

As previously described and shown in FIG. 5, in some embodiments, the UAV 12 may comprise one or more Electronic Speed Control (ESC) 34. In some embodiments, the ESC(s) 34 may control the operation of the control surfaces 60 of the airframe 20 and/or may control the propulsion system 28, either in conjunction with or instead of the controller 22.

In some embodiments, in which the UAV 12 may comprise one or more actuator 38, the controller 22 and/or the ESC(s) 34 may control the operation of the actuator 38 to actuate the propulsion system 28 (for example, the rotor blade) and/or the control surfaces 60 of the UAV 12. In some embodiments, the ESC 34 may be electrically connected to the controller 22 and the actuator 38. The controller 22 may provide control signals for the ESC 34, which in turn provides actuator signals to the electrically connected actuator 38 so as to actuate the corresponding component of the propulsion system 28 (such as the rotor) or control surface 60 on the airframe 20. In some embodiments, feedback signals can also be provided by the actuator 38 and/or the ESC 34 to the controller 22.

In one embodiment, the number of ESCs 34 is equal to the number of actuators 38 (such as actuators 38 controlling rotors) of the UAV 12. For example, a 4-rotor UAV 12d may have four actuators 38 and four ESCs 34. In an alternative embodiment, the number of ESCs 34 may be different (more or less) than the number of actuators 38.

In some embodiments, the ESC 34 may control the speed of revolution of the power system 26, such as a motor/generator or an engine.

In some embodiments, the ESCs 34 may be optional. In some embodiments, instead of, or in addition to, the ESCs 34, other types of actuator controllers can be provided to control the operation of the actuators 38, and/or the controller 22 may directly control the control surfaces 60 and/or the propulsion system 28.

UAV Communications System 24:

The communications system 24 of the UAV 12 may communicate with an external system, such as the remote station 14, or other UAVs 12, UASs 10, aircraft, or other vehicles (including ground vehicles or satellites). As depicted in FIG. 5, the communications system 24 may have one or more receiver 110 and one or more transmitter 112. The communications system 24 may have one or more antenna 114 and one or more attenuator 116 for the antenna (s) 114. The attenuator 116 may reduce the strength of a signal from or to the antenna 114. The attenuator 116 may be used for range testing between the UAV 12 and the remote station 14.

An interlock (not shown) may be used to prevent the UAV 12 from taking off with the attenuator 116 in place. The interlock is a device that makes the state of two mechanisms mutually dependent. In one example of an interlock, a sensor is configured to detect that the attenuator 116 is in place. If the attenuator 116 is in place, the UAV 12 is prevented from flying (or flying beyond a predetermined distance) to prevent the UAV 12 from flying beyond the range of the controller 22 with the attenuator 116 attached to the UAV 12. The attenuator 116 may also be affixed to the case 17 such that, when the UAV 12 is removed from the case 17, the attenuator 116 is effectively removed.

The antenna 114 may transmit/receive one or more signal to/from the communications system 24 to communicate with the remote station 14 and/or other UAV 12, aircraft, and/or vehicles.

Non-exclusive examples of communications systems are described in U.S. Pat. No. 8,477,190, issued Jul. 2, 2013, titled "Real-Time Moving Platform Management System," which is hereby incorporated by reference in its entirety.

Figure 15:
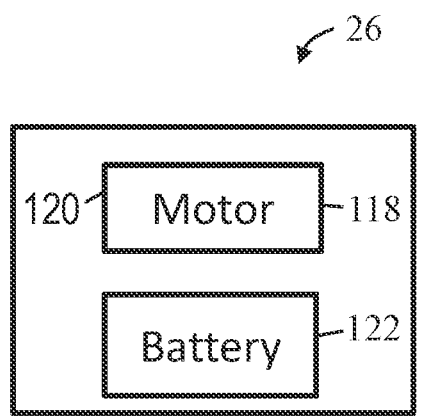
FIG. 15 is a block diagram of an exemplary embodiment of a power system of an unmanned aerial vehicle in accordance with the present disclosure.

UAV Power System 36:

The power system 26, as depicted in FIG. 5, may comprise one or more power generation and/or storage devices. In one embodiment, as illustrated in FIG. 15, the power system 26 may comprise one or more motor 118 or engine (not shown). For example, the engine may be a piston engine or a jet. In one embodiment, the power system 26 may comprise one or more generator and/or a solar power system (not shown) for generating power to supply to the motor 118 or other components of the UAV 12. In one embodiment, the power system 26 may comprise one or more fuel cell (not shown) for generating electrical energy to supply to the motor 118 of the power system 26.

In one embodiment, the motor 118 of the power system 26 may have a light-weight housing 120 made of plastic, or other low-weight material. For example, a motor with a plastic housing may be used (e.g., Emax PM2212 920KV, Plastic Brushless Motor).

The housing 120 of the motor 118 may be integrated with the airframe 20 and/or a part of the airframe 20. For example, the housing 120 may be molded or printed into the airframe 20, such that fewer or no fasteners (such as screws) are needed to secure the motor(s) 118 to the airframe 20, thus eliminating the potential failure of the fasteners.

In one embodiment, as shown in FIG. 15, the power system 26 may also comprise one or more battery 122 sized to provide power for the desired task set for the UAV 12. Capacity of the battery 122 may be sized for the task with a margin for error. Typically, for small UAVs 12, the battery 122 may make up a significant portion of the weight of the UAV 12. In one embodiment, multiple batteries 122 may be used in conjunction with a base station, such as the remote station 14, such that the UAV 12 can fly back to the remote station 14 and switch out the battery 122. In one embodiment, the battery 122 may be charged from the remote station 14. The battery 122 may be automatically exchanged for another battery at the remote station 14.

The one or more battery 122 may directly plug into a socket of the PCB 50 so there are no wires between the battery 122 and the power bus 36, thus eliminating the added weight of wiring between the battery 122 and the power bus 36.

In one embodiment, the controller 22 and/or the remote station 14 may monitor voltage of the battery 122 to help determine the remaining capacity of the battery 122. Total battery power output may be monitored (both volts and amps) to determine the total power drain from the battery 122. Batteries 122 may have a built-in check (not shown) so the operator 16 can easily check the power level of the battery 122. The built-in check may be a push-button with visual or audible indicators of the level of power of the battery 122.

The controller 22 and/or the remote station 14 may shut down the power system 26 or components of the power system 26, such as the one or more motors 118 (FIG. 15), in the event of a malfunction. For example, the controller 22 and/or remote station 14 may shut down the power system 26 when an impact is detected, such as by an accelerometer; or when there is a disruption in the closed loop sensor 80 surrounding the airframe 20 indicating the airframe 20 has been compromised.

UAV Propulsion System 28:

As shown in FIG. 2, the propulsion system 28 may comprise one or more propulsion device 130, including a combination of different types of propulsion devices 130.

In one embodiment, the one or more propulsion device 130 of the UAV 12f may be a jet engine.

In one embodiment, the one or more propulsion device 130 may comprise one or more rotor 132. The term "rotor" as used herein refers to a hub with a number of rotating air foils or blades. The rotor 132 may be orientated vertically (such as to provide propulsion), horizontally (such as to provide lift), or may be angularly adjustable (such as a tilt rotor). In one embodiment, the one or more rotor 132 may be comprised of a material that yields when subjected to force, such as in the event of a strike of the rotor 132 against another object. For example, if the rotor 132 strikes an object, the rotor 132 may deflect, bend, or break to absorb the force of the strike.

Figure 16:
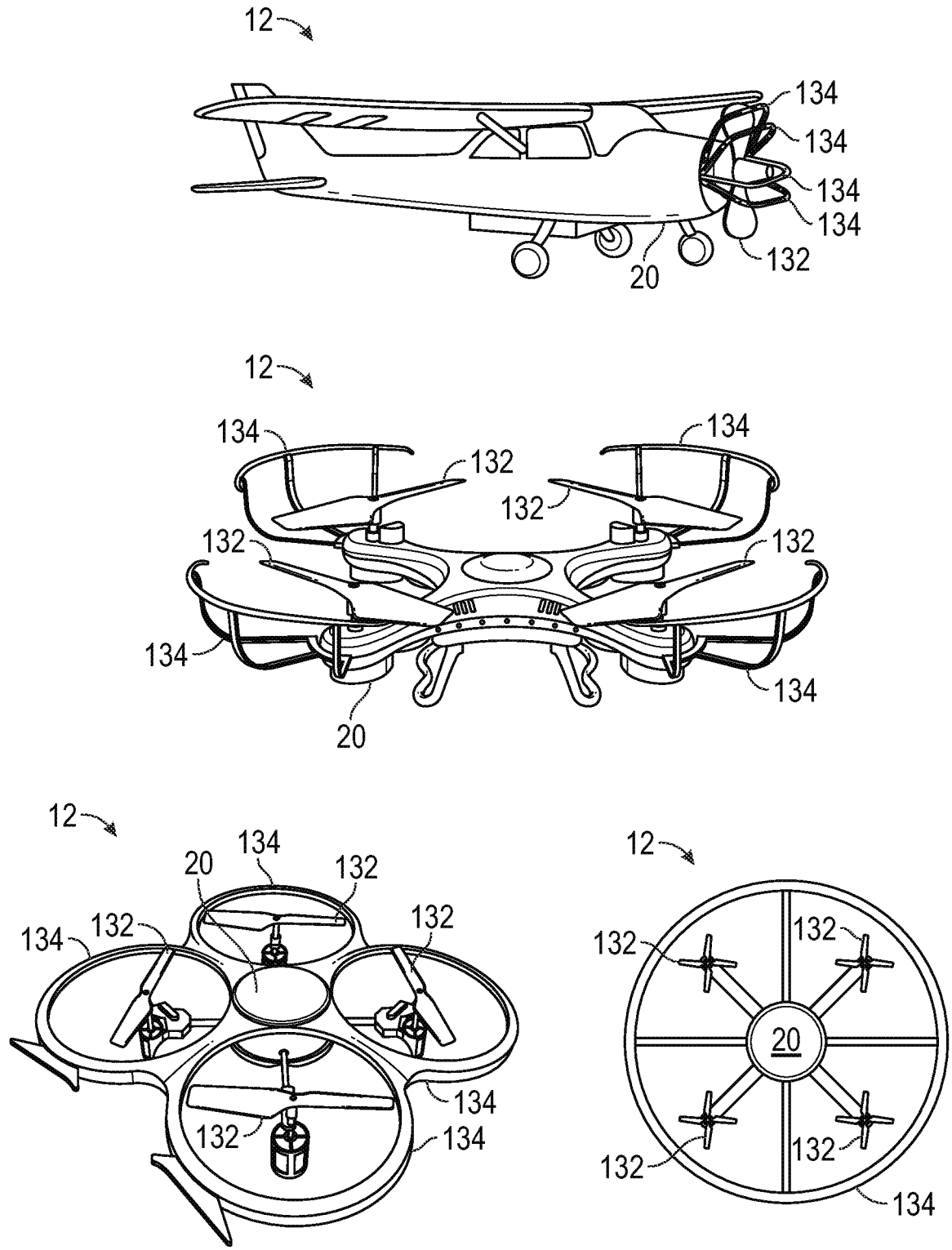
FIG. 16 is an illustration of exemplary embodiments of unmanned aerial vehicles having propeller guards in accordance with the present disclosure.

As shown in FIG. 16, in one embodiment, the propulsion system 28 may further comprise a propeller guard 134. The propeller guard 134 may be connected to and supported by the airframe 20. The propeller guard 134 may surround the rotor(s) 132 with a shroud or a cowling. The propeller guard 134 may cover exposed areas of the rotor(s) 132. In one embodiment, the propeller guard 134 may have openings no longer than one-half inch. The dimensions of the openings may comply with the Occupational Safety Health Administration regulation 1910.212(a)(5), which states in part, "The use of concentric rings with spacing between them not exceeding a one-half inch are acceptable, provided that sufficient radial spokes and firm mountings are used to make the guard rigid enough to prevent it from being pushed into the fan blade during normal use."

In one embodiment, removing the propeller guard 134 may interrupt electricity to the propulsion system 28. In one embodiment, when the propeller guard 134 is removed, a circuit (not shown) of the power system 26 is interrupted so that the power system 26 is nonoperational, and the rotor 132 is therefore no longer provided power. The propeller guard 134 may include a continuous loop conductor (e.g., conductive ink) (not shown) that substantially covers the outline of the propeller guard 134, such that, in the event that the propeller guard 134 is broken, the conductive path is also broken. When the controller 22 of the UAV 12 detects a break in the propeller guard 134, the UAS (such as the controller 22 and/or the remote station 14) may shut down the power system 26 and/or emit an audible and visual warning to the operator 16 and anyone in the vicinity.

The controller 22 and/or the remote station 14 may shut down the propulsion system 28 or components of the propulsion system 28, such as the rotors 132, in the event of a malfunction. For example, the controller 22 and/or remote station 14 may shut down the propulsion system 28 when an impact is detected, such as by the accelerometer; or when there is a disruption in the closed loop sensor 80 surrounding the airframe 20 indicating the airframe 20 has been compromised.

UAV Avionics System 30 and Navigation System 32:

As shown in FIG. 5, in one embodiment, the UAV 12 may comprise an avionics system 30. In one embodiment, the avionics system 30 may include mechanical and electronic flight control mechanisms such as motor(s), servo(s), fuel control switches, etc. (not shown) associated with various flight operations of the UAV 12. In one embodiment, the avionics system 30 may comprise one or more processor (not shown). In one embodiment, the avionics system 30 may comprise one or more actuators 38.

Figure 17:
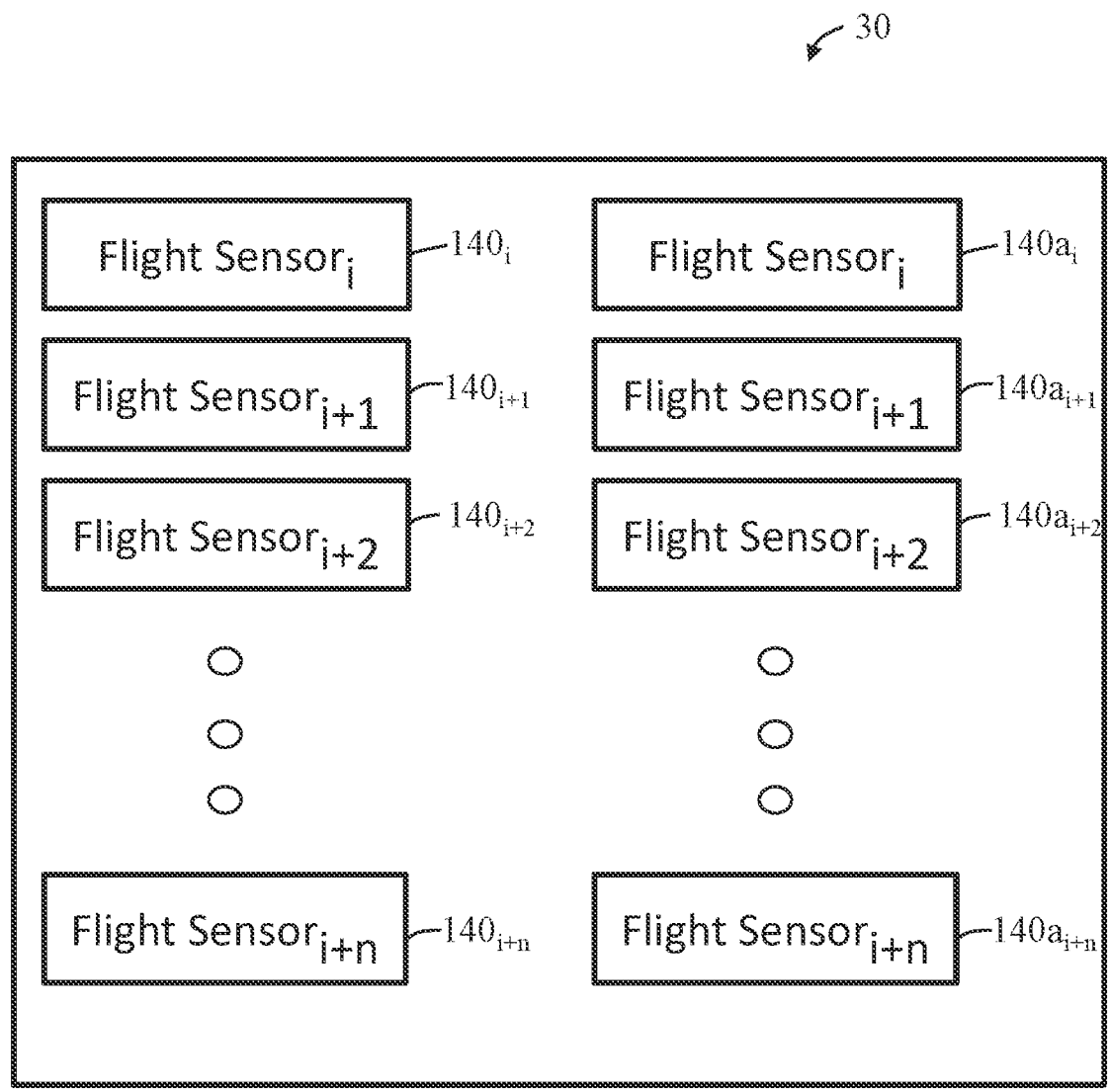
FIG. 17 is a block diagram of an exemplary embodiment of an avionics system of an unmanned aerial vehicle in accordance with the present disclosure.

In one embodiment, illustrated in FIG. 17, the avionics system 30 may comprise one or more sensor $140_i \ldots 140_{i+n}$. Of course, it will be understood that one or more of the sensors $140_i \ldots 140_{i+n}$ may be onboard the UAV 12 but outside of the avionics system. Nonexclusive examples of sensors $140_i \ldots 140_{i+n}$ include a roll sensor, a pitch sensor, a yaw sensor, an altitude sensor (such as an altimeter), a directional sensor, and a velocity sensor. In one embodiment, the avionics system 30 may comprise an inertial measurement unit (IMU) for measuring the velocity, orientation, and/or gravitational forces of the UAV 12. The IMU may include one or more accelerometers and/or gyroscopes.

The sensors $140_i \ldots 140_{i+n}$ may further comprise an airspeed sensor for determining the relative speed between the UAV 12 and the body of air through which it is travelling. In one embodiment, the sensors $140_i \ldots 140_{i+n}$ may comprise a pitot sensor comprising both static and dynamic pressure sensors.

The sensors $140_i \ldots 140_{i+n}$ may comprise one or more altitude sensor, which provides a signal indicative of the altitude of the UAV 12 above sea level and/or above ground. For example, the altitude sensor may comprise a GPS receiver, a magnetometer, a barometric altimeter, etc. Signals from the sensor(s) $140_i \ldots 140_{i+n}$ may be sent via a power bus (not shown) to the avionics system 30 and/or the navigation system 32.

In previous systems that utilized GPS receivers and/or magnetometers, the GPS receiver and magnetometer were located close to the other electrical components. However, the operation of magnetometers may be affected by interference from other electrical components and/or the GPS receiver. To reduce risk of interference, in one embodiment, the ESCs 34 of the motors 118 may be mounted away from the magnetometer to prevent interference. Additionally, or alternately, the ESCs 34, magnetometer, and/or GPS receiver may be shielded.

In one embodiment, the sensors $140_i \ldots 140_{i+n}$ may comprise one or more collision detection sensor. Non-exclusive examples of collision detection sensors include an ultra-sonic device, a radar device, a laser device, a sonar device, an imaging device, and a transponder/receiver device. In one embodiment, the one or more collision detection sensor may be utilized by the avionics system 30 to determine position of and avoid collisions with other aircraft, the ground, other structures, trees, and/or other obstacles.

In one embodiment in which the collision detection sensor is a transponder/receiver device, the avionics system 30 may comprise a Traffic Alert and Collision System (TACS) utilizing the collision detection sensor to warn of aircraft within the vicinity of the UAV 12. Such systems are well known by persons having skill in the art, for example, as described in "The Traffic Alert and Collision Avoidance System," Kuchar and Drumm, Lincoln Laboratory Journal, Volume 16, Number 2, 2007, which is hereby incorporated by reference in its entirety herein. The controller 22 of the UAV 12 and/or the remote station 14 may utilize information from the TACS to change flight paths to avoid collisions with other aircraft.

In one embodiment, the avionics system 30 may comprise a Terrain Awareness and Warning System (TAWS) utilizing one or more sensor $140_i \ldots 140_{i+n}$, such as the one or more collision detection sensor. The TAWS may signal the controller 22 and/or the remote station 14 when the sensor 140 detects terrain or structures within a predetermined distance of the UAV 12, when the UAV 12 goes outside predetermined flight parameters, and/or when the UAV 12 leaves a predetermined flight path or flight area.

In one embodiment, the navigation system 32 may be located within the UAV 12. Additionally, or alternately, part or all of the navigation system 32 may be located in the remote station 14. The navigation system 32 may plan and/or deploy the flight path of the UAV 12, may determine/receive location coordinates, may determine/receive way points, may determine/receive real world position information, may generate and transmit signals to appropriate components to control the flight of the UAV 12, and so on.

The avionics system 30 and/or the navigation system 32 may monitor the lateral location (latitude and longitude) of the UAV 12 (for example, using a GPS receiver), and/or monitor the altitude of the UAV 12 using the signals from the sensors $140_i \ldots 140_{i+n}$, and/or may receive information from the remote station 14.

In one embodiment, the controller 22 utilizes information from the avionics system 30 in conjunction with the navigation system 32 to fly the UAV 12 from one location to another. For example, the controller 22 may utilize the information to control the control surfaces 60 of the airframe 20 of the UAV 12 (for example, elevators, ailerons, rudders, flaps, and/or slats).

The avionics system 30 and/or the navigation system 32 may include a memory (not shown) on which location of controlled airspace is stored, or may communicate with an external device, such as an air traffic control station (not shown) or the remote station 14 to receive transmitted data indicating the location of controlled airspace. The avionics system 30 and/or the navigation system 32 may provide signals to the ESC 34 and/or the controller 22 to be used to control the speed of rotation of the rotor 132 or the output of the motor 118 or engine.

The avionics system 30 and/or the navigation system 32 may estimate the current velocity, orientation and/or position of the UAV 12 based on data obtained from the sensors 140, such as visual sensors (e.g., cameras), IMU, GPS receiver and/or other sensors, perform path planning, provide data to the controller 22 (and/or control signals to the actuators 38) to implement navigational control, and the like.

In one embodiment, the UAV 12 may comprise one or more secondary sensors $140a_i \ldots 140a_{i+n}$ (FIG. 17) and secondary controller 22a (FIG. 5) that may be implemented to detect a fault in the primary sensors 140 and/or controller 22 and/or to replace functions of failed sensors $140_i \ldots 140_{i+n}$ or a failed controller 22. The secondary sensors $140a_i \ldots 140a_{i+n}$ may include redundant sensors comprising one or more accelerometer, gyro, magnetometer, GPS, etc. In one embodiment, the secondary sensors $140a_i \ldots 140a_{i+n}$ may comprise redundant attitude sensors and control systems.

The secondary sensors $140a_i \ldots 140a_{i+n}$ and controller 22a may be electrically isolated from the primary controller 22 and/or sensors $140_i \ldots 140_{i+n}$ via opto isolators and/or magnetic relays so a catastrophic failure of the primary controller 22 and/or sensors $140_i \ldots 140_{i+n}$ does not cascade to the secondary sensors $140a_i \ldots 140a_{i+n}$ and controller 22a. If the secondary sensors $140a_i \ldots 140a_{i+n}$ and controller 22a detect a failure in the primary sensors $140_i \ldots 140_{i+n}$ or controller 22, the secondary controller 22a may shut off a relay that connects the primary sensors $140_i \ldots 140_{i+n}$ and controller 22 to the power system 26, such as the battery 122. When a fault is detected, a protocol in the controller 22 may decide if it is appropriate for the UAV 12 to attempt to land or shut down immediately.

In one embodiment, the sensors $140_i \ldots 140_{i+n}$ of the UAV 12 comprise one or more geo-localization sensor. Non-exclusive examples of a geo-localization sensor include a Global Positioning System (GPS), a Global Navigation Satellite System, a hyperbolic radio navigation system (e.g., LORAN), a motion capture system (e.g., such as manufactured by Vicon), a detector of lines and/or optical points of reference on the ground/structures, and an altimeter.

A form of localization, for example, utilizing the geo-localization sensor, may be used to keep the UAV 12 within a specific operation area (referred to as an "operation box" 211) for the current inspection task. The coordinates of the boundary of the allowed operation area (which may be referred to as a "box" or "fence") may be stored on the UAS 10.

The box 211 may be predetermined. For example, the box 211 may be determined using parcel boundaries, building outlines, cadastre data, and/or other sources of data (e.g., in any appropriate coordinates, such as latitude and longitude) and altitude. The box 211 may be determined on-site by the operator 16 prior to take off of the UAV 12. On-site establishment of the box 211 (i.e., "boxing" or "fencing") may be done using a handheld device (for example, a smartphone or tablet having GPS capabilities) to obtain the box corners coordinates. For example, the operator 16 may walk to the corners of the box 211 and record/set a point for the corner of the box 211. In one example, the operator 16 may place the points of the box 211 on a map displayed on the handheld device. In one embodiment, the operator 16 may choose or define a radius from a point as the box 211 or a boundary around a point as the box 211. In one embodiment, the operator 16 may define attributes of one or more point (for example, location or title of the point, for example, southwest corner). In one embodiment, the operator 16 may define outlines of structures and/or trees within the box 211. These vertices and/or boundaries may define the outside boundary of a given property, the location of tall obstructions such as trees, and/or the outline of a structure that is to be captured.

The box coordinates and/or outlines of structures or obstructions may then be relayed from the operator 16 (and/or the handheld device) to the UAS 10 and/or the UAV 12 (for example, through Wi-Fi/Bluetooth, or manual download). In one embodiment, the handheld device may be the remote station 14.

The box 211 may be geographical coordinates and/or altitude values that define a geometric shape (e.g., polygon, circle, square, etc.) on and/or above the earth. In one embodiment, the box 211 may have a maximum altitude or z value. The box 211 may be a 3D polygon having a height. The box 211 may be a 2D geometric shape on the ground that extends upwards either to a maximum z height or up to a maximum altitude. The maximum z height or maximum altitude may be based at least in part on government regulations.

The controller 22 may provide instructions to the UAV 12 such that the UAV 12 stays inside the box 211 and does not fly over adjacent or other properties. The controller 22 and/or the remote station 14 may take appropriate action if the remote station 14 and/or the controller 22 detects that the UAV 12 is leaving the operation box 211. For example, navigation coordinates may be provided to direct the UAV 12 away from leaving the operation box 211, and/or the UAV 12 may be directed to land or to fly to the remote station 14. In one embodiment, the data about the box 211 and/or structures/vegetation in the box 211 are integrated into a flight plan for the UAV 12.

The data may also be used by the controller 22 to help ensure the UAV 12 doesn't collide with structures, trees, etc. The data may also be used by the controller 22 to maintain a specific distance from a structure being captured with images/video, so that the images and video will be a consistent sample distance (millimeters per pixel for example). For example, each pixel of the image 44 taken by the camera 42 of the UAV 12 may represent 1 mm on a structure in the image.

UAV Speed Reduction Device 150:

In one embodiment, as illustrated in FIG. 18, the UAV 12 may comprise a speed reduction device 150. Non-exclusive examples of speed reduction devices 150 include air brakes 152 and parachutes 154. The speed reduction device 150 may be deployed automatically or manually when the controller 22 and/or the remote station 14 or operator 16 detects a malfunction in the UAV 12 and/or that the UAV 12 is out of control. Typically, the speed reduction device 150 creates drag to limit the airspeed of the UAV 12 and therefor reduce kinetic energy. In some windy conditions, the speed reduction device 150 may increase the velocity of the UAV 12 by acting as a sail.

The air brakes 152 may be part of the airframe 20 in the form of hard or pliable panels/sails. In one embodiment, the air brakes 152 may be in the form of gas inflated bladders (not shown).

In propeller driven UAVs 12, the rotor 132 may be utilized as the speed reduction device 150.

Figure 19:
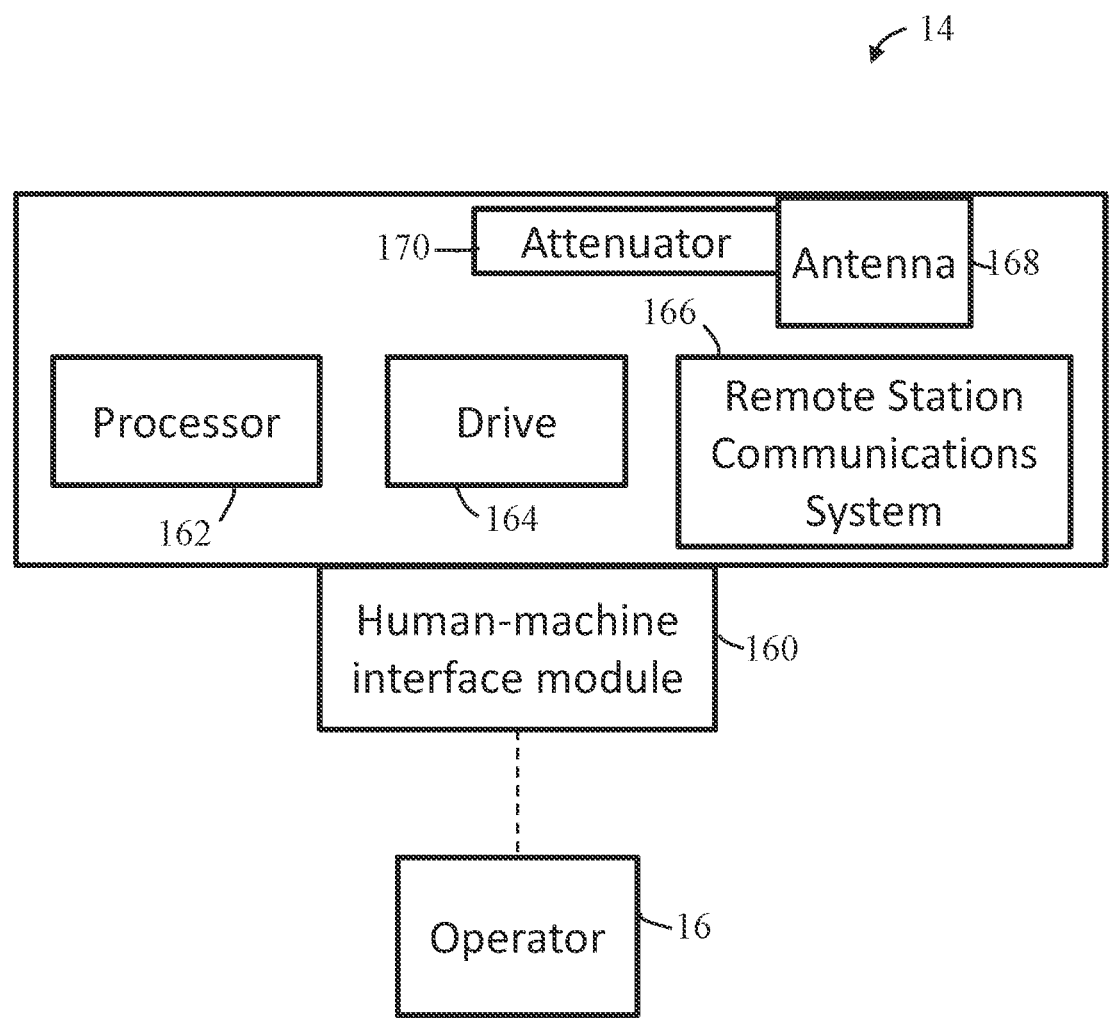
FIG. 19 is a block diagram of an exemplary embodiment of a remote station of an exemplary unmanned aerial system in accordance with the present disclosure.

UAS Remote Station 14:

As illustrated in FIG. 19, in one embodiment, the remote station 14 may comprise components that interface with the unmanned aerial vehicle 12 and/or the remote operator 16 and/or that process data to/from the UAV 12. The remote station 14 may comprise a human-machine interface module 160, one or more processor(s) 162 (hereinafter "the processor"), one or more drive(s) 164 (hereinafter "the drive"), and a remote station communications system 166. In one embodiment, the remote station 14 may comprise one or more antenna(s) 168 (hereinafter "the antenna"). The antenna 168 may transmit/receive one or more signal to/from the remote station communications system 166 to communicate with one or more UAV 12, aircraft, and/or vehicles.

In one embodiment, the processor 162 may comprise one or more of a smartphone, a tablet personal computer, a personal computer processor, and/or other personal computing device.

The remote station 14 may receive/download onboard data from the UAV 12, for example, through the remote station communications system 166. In one embodiment, the onboard data may include images 44 and/or metadata, such as metadata about the images 44, about/from the image capture device 42, and/or about/from the sensors 140.

The remote station 14 may upload commands from the remote station 14 to the UAV 12, for example, through the remote station communications system 166, in order to control functions of the UAV 12 and/or the payload 40 of the UAV 12. The remote station 14 may transmit commands and/or data to the UAV 12. In some embodiments, the remote station 14 may control the UAV 12 in real time in all three physical dimensions. However, in some embodiments the UAV 12 may operate autonomously or with varying degrees of guidance from the remote station 14 and/or the remote operator 16.

In one embodiment, the remote station 14 may provide the remote operator 16 with real time data concerning the UAV 12 and/or data transmitted from the UAV 12 through the human-machine interface module 160. For example, the remote station 14 may provide the operator 16 with flight information necessary to control the flight of the UAV 12. For example, flight information may include cockpit-type control data such as data from the sensors 140 and/or indications of roll, pitch, and yaw angle, navigational view of attitude data, current position of the UAV 12 with coordinates and/or visually, failure of components/systems within the UAV 12, and so on.

The human-machine interface module 160 may be configured for the operator 16 to receive data and to input data and/or commands. In one embodiment, the human-machine interface module 160 may comprise a display displaying a view transmitted from the UAV 12 similar to a view that an onboard pilot would have. The human-machine interface module 160 may include a control panel for remotely piloting the UAV 12. The human-machine interface module 160 may comprise a graphical user interface. The human-machine interface module 160 may comprise user input devices through which the operator 16 may enter commands and data. Non-exclusive examples of input devices may include an electronic digitizer, a microphone, a keyboard, and a pointing device such as a mouse device, trackball device or touch pad device. Other input devices may include a joystick device, game pad device, satellite dish, scanner device, heads-up device, a vision system, a data bus interface, and so on.

The remote station 14 may translate commands from the operator 16 to the UAV 12 to control the flight control surfaces 60 and speed of the UAV 12. In one embodiment, the remote station 14 may translate simplistic inputs from the operator 16 into specific, detailed, precision-controlled flight control of the UAV 12. For example, the operator's 16 movement of a joystick may be translated by the processor 162 into commands and transmitted via the remote station communications system 166 and the communications system 24 of the UAV 12 to the controller 22 of the UAV 12 to adjust the flight control surfaces 60 of the UAV 12 to affect roll, pitch, and yaw.

In one embodiment, the remote station 14 may comprise one or more attenuator 170 on the antenna 168 for range testing. An interlock (not shown) may be used to prevent the UAV 12 from taking off with the attenuator 170 in place on the antenna 168 of the remote station 14. The attenuator 170 may be used for range testing between the UAV 12 and the remote station 14. The interlock is a device that makes the state of two mechanisms mutually dependent. In one example of an interlock, a sensor is configured to detect that the attenuator 116 is in place. If the attenuator 116 is in place, the UAV 12 is prevented from flying (or flying beyond a predetermined distance) to prevent the UAV 12 from flying beyond the range of the jcontroller 22 with the attenuator 116 attached to the UAV 12. The attenuator 116 may also be affixed to the case 17 such that when the UAV 12 is removed from the case 17 the attenuator 116 is effectively removed.

In one embodiment, the drive 164 and associated computer storage media such as removable storage media (e.g., CD-ROM, DVD-ROM) and non-removable storage media (e.g., a hard drive disk), may provide storage of computer readable instructions, data structures, program modules and other data. The drive 164 may include an operating system, application programs, program modules, and one or more database.

In one embodiment, the remote station 14 may be implemented as a portion of a small-form factor portable (or mobile) electronic device such as a portable computing device, a mobile computing device, an application specific device, or a hybrid device that include any of the above functions. The remote station 14 may be implemented as a personal computer including both laptop computer and non-laptop computer configurations. Moreover, the remote station 14 may be implemented as a networked system or as part of a specialized server.

In one embodiment, the remote station 14 may comprise an automatic dependence surveillance-broadcast (ADS-B) device (not shown) such that when a conventional aircraft or another UAV 12 enters the area the operator 16 may be notified and land the UAV 12. Optionally, the controller 22 of the UAV 12 may automatically land the UAV 12 when notified. The ADS-B device may be configured with ADS-B "Out" and/or ADS-B "In". ADS-B "Out" periodically broadcasts information about the UAV 12, such as identification, current position, altitude, and velocity, through a transmitter, such as the communications system 166 of the remote station 14 (and/or the communications system 24 of the UAV 12). ADS-B "Out" may provide air traffic controllers and other aircraft with real-time position information. ADS-B "In" allows the reception by the UAS 10 of ADS-B data, such as direct communication from nearby aircraft of their identification, current position, altitude, and/or velocity. In one embodiment, the ADS-B device is located in either or both the remote station 14 and/or the UAV 12.

In one embodiment, the remote station communications system 166 may comprise a transmitter and a receiver.

In one embodiment, the remote station 14 may comprise a wireless datalink subsystem. The wireless datalink subsystem may be configured for remote communication with the UAV 12.

In one embodiment, the remote station 14 may further comprise a mobile power system, such as one or more battery (not shown).

UAV 12 and Remote Station 14 Communication

In one embodiment, the communications system 24 of the UAV 12 and the communications system 166 of the remote station 14 are configured to form a connection between the UAV 12 and the remote station 14 using radio frequency protocols that may or may not meet the requirements of a Wi-Fi network.

In one embodiment, the communications system 24 of the UAV 12 and the communications system 166 of the remote station 14 may utilize a cellular network for communication between the UAV 12 and the remote station 14 and/or communication between the UAS 10 and other vehicles and/or systems. In one non-exclusive example, the UAV 12 and/or remote station 14 may have cellular radios via which data may be communicated. A Verizon MiFi 4G LTE Global USB Modem is an example of such a device. The UAV 12 may connect to the cellular network using the modem and send telemetry, images, photos, etc. The UAV 12 may also receive commands/instructions on where to go next, flight plans, and/or what to photograph/video.

In one embodiment, the controller 22 in conjunction with the communications system 24 of the UAV 12 and/or the communications system 166 of the remote station 14 may operate in a networked environment using logical connections to one or more processors, such as a remote processor connected to a network interface. The remote processor may be the processor 162 of the remote station 14, or located all or in part separately from the remote station 14. The remote processor may be a personal computer, a server, a router, a network PC, a peer device or other common network node, and can include any or all of the elements described above relative to the controller. Networking environments are commonplace in offices, enterprise-wide area networks (WAN), local area networks (LAN), intranets and worldwide networks such as the Internet. It should be noted, however, that source and destination machines need not be coupled together by a network(s) or any other means, but instead, data may be migrated via any media capable of being written by the source platform and read by the destination platform or platforms. When used in a LAN or WLAN networking environment, the controller 22 may be coupled to the LAN through the network interface or an adapter.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a worldwide network such as (e.g., the Internet). The network(s) may also comprise a plurality of distinct networks that are adapted to operate together. The network(s) are adapted to provide communication between nodes. By way of example, and not limitation, the network(s) may include wireless media such as acoustic, RF, infrared and other wireless media.

A network communication link may be one nonexclusive example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Diagnostic Testing

In some embodiments, pre-flight diagnostic testing is employed. In one embodiment, the UAS 10 is programmed such that, when the UAS 10 is initially powered on, the UAV 12 will not operate without first performing a series of diagnostics to verify that all systems are properly calibrated and operating correctly. In embodiments having redundant sensors 140a (accelerometer, gyro, magnetometer, GPS, etc.), the remote station 14 may prompt the operator 16 (via the human-machine interface module 160, for example, with a text display or an audible voice) to rotate the UAV 12 on different axes. The values from each sensor pair (that is, the primary sensor 140 and the secondary sensor 140a) may be compared to verify that they match within a predetermined margin of error.

In one embodiment, as part of a pre-flight diagnostic routine the operator 16 may be prompted by the controller 22 and/or the processor 162 to anchor the UAV 12 to a weight or test rig that is heavy or anchored well enough so the UAV 12 may power up the propulsion system 28 to full power and remain secure on the ground. The preflight test may verify one or more of the following parameters: integrity of the propulsion system 28 at full power (for example, integrity of the rotor 132), RPM output, power consumption (for example, by each motor 118), performance of the electronic speed controls (ESCs) 34, yaw torque, health/output power of the battery 122 under load, thrust output from the propulsion system 28 (for example, each motor/propeller), integrity of the airframe 20, etc.

In one embodiment, collision detection diagnostics are employed. As part of a collision detection test, the operator 16 may be prompted to place an object in front of the collision detection sensor(s) to verify that all collision detection systems are working correctly. In one embodiment, the collision detection diagnostics utilize a pre-flight test rig/jig (not shown) so the predetermined distance for collision detection may be checked with precision.

In one embodiment, the diagnostic tests may also involve placing one or more attenuator 116 and/or attenuator 170 on the antenna(s) 114 of the UAV 12 or the antenna(s) 168 of the remote station 14 for range testing. An interlock may be used to prevent the UAV 12 from taking off when the attenuator(s) 116, 170 are in place.

Diagnostic tests also may be used to check environmental conditions and disallow use of the UAV 12 when it is too windy or the temperature is too hot or too cold. This is particularly important for the battery 122 which may have significantly lower power output in cold temperatures.

In one embodiment, in-flight diagnostic testing is employed. During flight operations a series of algorithms may be used to detect faults and suspend flight operations if required. For example, if the controller 22 adjusts power output to a particular motor 118 and does not "see" the intended change in attitude as a result, the controller 22 may assume there is a malfunction or the vehicle is "stuck" and power down all motors 118.

Figure 20:
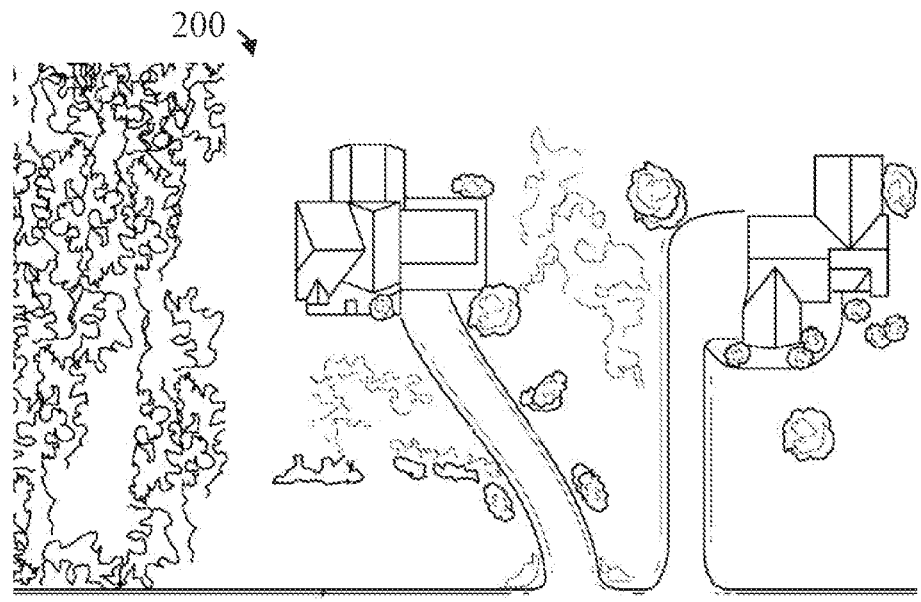
FIG. 20 is a top plan view of an exemplary geographic location.

Referring now to FIGS. 20-24, an example of one embodiment of the UAS 10 in use in accordance with the present disclosure will be described. As illustrated in FIG. 20, a property 200 of interest is identified, such as with location information 202. The location information 202 may be in the form of any coordinate system or location information system, including, but not limited to, a street address, a plat location, and/or latitude and longitude coordinates.

Figure 21:
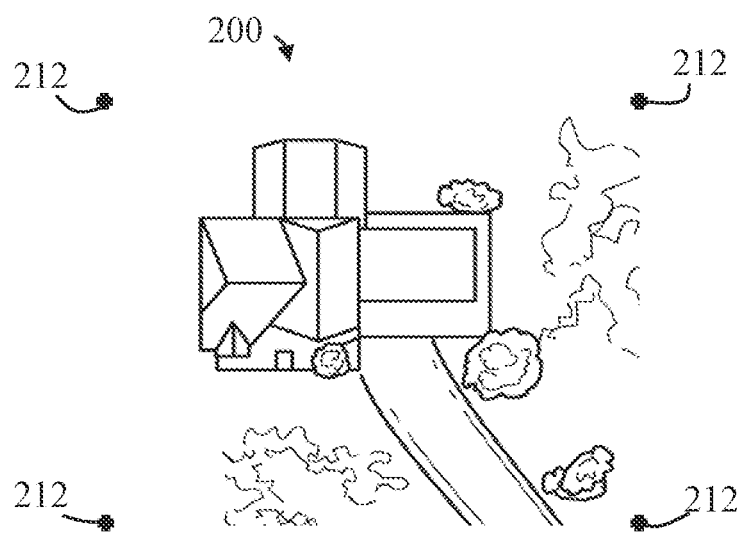
FIG. 21 is an illustration of an exemplary embodiment of boundary marking of the exemplary geographic location of FIG. 20.
Figure 22:
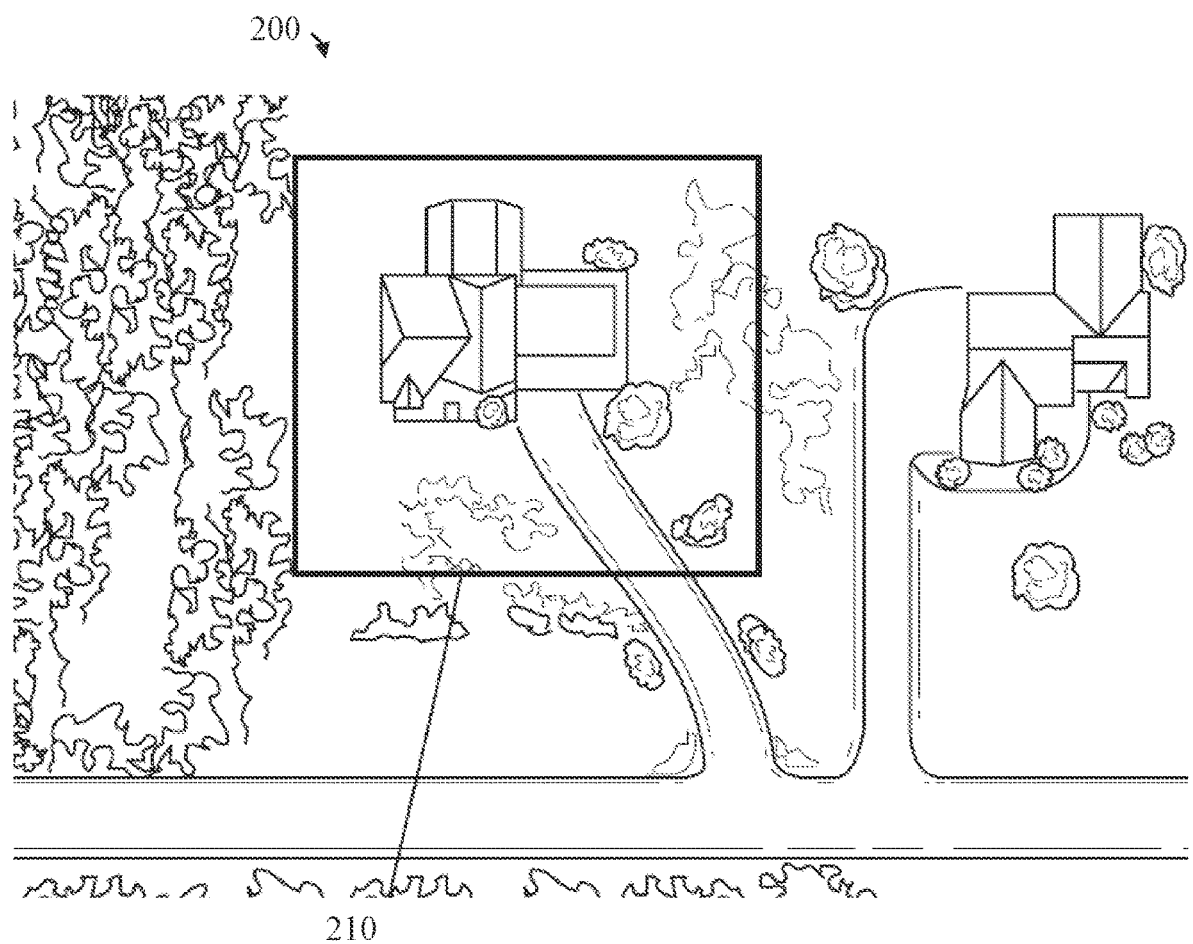
FIG. 22 is an illustration of another exemplary embodiment of boundary marking of the exemplary geographic location of FIG. 20.

In one embodiment, a general location of the property may be provided, and the UAS 10 may then be provided with, and/or determine, specific boundaries 210 of an inspection site of the property 200—that is, of the operation box 211. In one embodiment, the operator 16 may identify the outer boundaries 210 of the inspection site. In one embodiment, the operator 16 may identify two or more points 212 on the outer boundaries 210 of the operation box 211, as illustrated in FIG. 21. The UAS 10 may then determine the outer boundaries 210 of the operation box 211 based on the identified points 212, as shown in FIG. 22. Though FIG. 21 illustrates the outer boundaries 210 of the operation box 211 as square shaped, the outer boundaries 210 may have the shape of any polygon or polygons. The outer boundaries 210 may have a three dimensional shape including, for example, a polygon having a height, or other structure.

Figure 23:
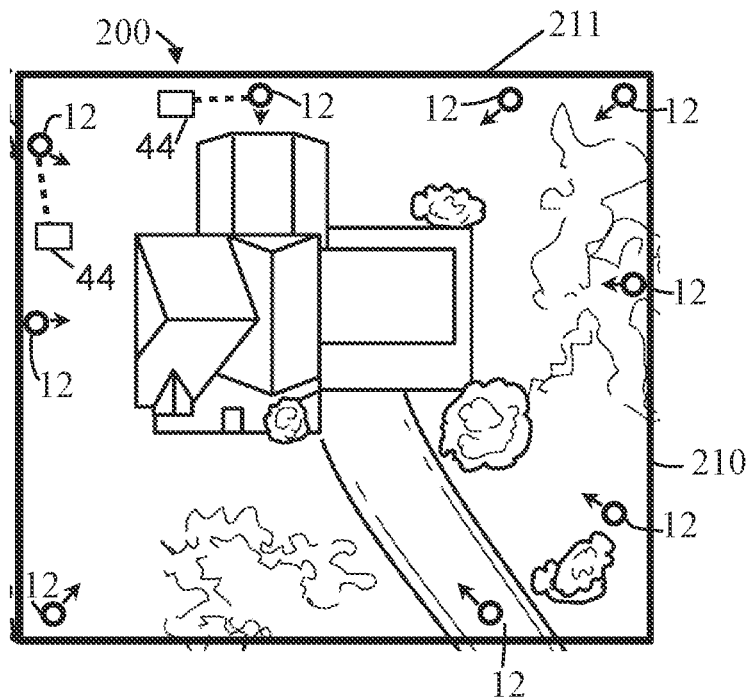
FIG. 23 is an illustration of an exemplary embodiment of an unmanned aerial vehicle in use in the exemplary geographic location of FIG. 20.
Figure 24:
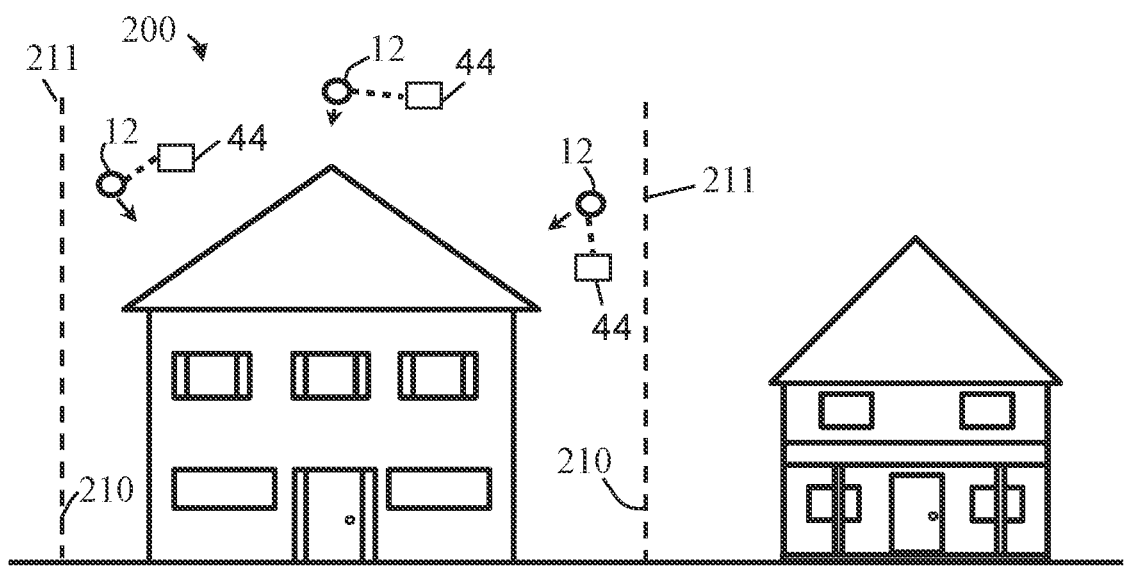
FIG. 24 is a front view of the unmanned aerial vehicle in use of FIG. 23.

As illustrated in FIGS. 23 and 24, the navigation system 32 of the UAS 10 may utilize the outer boundaries 210 to guide the UAV 12 to remain within the outer boundaries 210 of the operation box 211. Further, the UAV 12 may be directed to only capture images 44 of objects/locations within the boundaries 210, thus protecting privacy interests of surrounding properties.

In one embodiment, the navigation system 32 may utilize the coordinates of the boundaries 210 of the operation box 211 to determine a flight plan for the UAV 12 that remains within the operation box 211. The navigation system 32 may provide the UAV 12 geographical coordinates and/or altitude values that define a geometric shape (e.g., a polygon, a circle, a square, etc.) on and/or above the earth for the operation box 211. The navigation system 32 may provide the UAV 12 a maximum altitude or z value. The geometric shape may be a 3D polygon, having a 2D geometric shape on the ground that extends upwards, either to a maximum z height or up to a maximum altitude (such as a maximum altitude allowed by government regulations). In one embodiment, the controller 22 maintains the UAV 12 inside the 3D polygon such that the UAV 12 does not fly over adjacent and/or other properties. In one embodiment, parcel data, building outlines, and other sources of data may be used to define the geometric shape.

In one embodiment, in addition to, or alternatively to, ensuring that the UAV 12 does not leave the operation box 211, the navigation system 32 may ensure that the camera 42 carried by the UAV 12 does not capture data and/or images 44 on any neighboring structures, cars, and/or individuals, etc. In one embodiment, the 3D polygon information and data from attitude sensors on the camera 42 and/or the UAV 12 carrying the camera 42, can be used to ensure that camera 42 does not capture data and/or images 44 on any neighboring structures, cars, and/or individuals, etc. In one embodiment, 3D data about a structure may be used to ensure the camera 42 is oriented in such a way so that only the structure is in the frame of the image 44 when taking the image 44 or video and that neighboring structures, individuals, and/or vehicles are not in the background of the image 44. In one embodiment, 3D data about a neighboring structure may be used to ensure the camera 42 is oriented in such a way so that the neighboring structure is not captured in the image 44.

Further, if the UAV 12 is utilized to capture images 44 with the image capture device 42, the navigation system 32 may also determine the flight plan that keeps the image capture device 42 of the UAV 12 orientated such that the field of view (designated with arrows from the UAV 12 in different positions within the operation box in FIGS. 23 and 24) of the image capture device 42 is solely within the boundaries 210 of the operation box 211, while capturing desired images 44 of the property 200 of interest.

In one embodiment, at one or more instant in time, the controller 22 of the UAV 12 and/or the remote station 14 may compare the position of the UAV 12, based on data from sensors 140, such as the GPS and/or the altimeter, with the coordinates of the boundaries 210 of the operation box 211. If the distance between the position of the UAV 12 and the boundaries 210 is less than or above a predetermined amount, the UAV 12 may be directed to adjust position and/or orientation to maintain the position of the UAV 12 within the boundaries 210. If the UAV 12 is utilized to capture images 44 with the image capture device 42, the orientation and position of the UAV 12, and thus the image capture device 42, may be adjusted such that the field of view of the image capture device 42 is solely within the boundaries 210 of the operation box 211 to respect the privacy of neighbors adjacent to the boundaries 210.

In one embodiment, the UAV 12 may be orientated and positioned such that the image capture device 42 has a field of view that encompasses an object or structure within the boundaries 210.

In one embodiment, the UAS 10 and the image capture device 42 may be utilized in a method to capture aerial images 44 of a structure while avoiding capturing images of neighboring properties.

In one embodiment, the UAS 10 may be utilized to determine one or more ground location and/or one or more surface location. In one embodiment, the UAS 10 may be positioned on the ground/surface location. A location reading from a GPS onboard the UAS 10 may be taken with the UAS 10 on the ground/surface location. The location reading may include the latitude, the longitude, and the altitude above sea level of the UAS 10. The altitude above sea level from the GPS may be designated as a ground/surface elevation point for the latitude/longitude location of the UAS 10. Once the UAS 10 is launched into the air, another GPS reading for the UAS 10 may be taken, including the latitude, the longitude, and the altitude above sea level of the UAS 10. The height of the UAS 10 above the ground/surface may be calculated by subtracting the ground/surface elevation point from the altitude above sea level of the UAS 10 in the air.

Metadata

In one embodiment, the controller 22 and/or the image capture device 42, the one or more sensors 140, and/or the image capture module 100 may capture metadata associated with one or more of the images 44. Nonexclusive examples of metadata include information about and/or from the UAV 12, the one or more sensors 140, and/or the image capture device 42.

Metadata about the image capture device 42 may comprise such data as the attitude of the UAV 12, the attitude of the image capture device 42, and/or the focal length of the image capture device 42, sensor size of the image capture device 42, pixel pitch of the image capture device 42, and/or distortion parameters of the image capture device 42.

The metadata may include information from the avionics system 30 and/or the navigation system 32 such as orientation and/or position of the UAV 12 based on data obtained from the sensors 140, such as the visual sensors (e.g., cameras), IMU, GPS receiver and/or other sensors 140.

The metadata may include data from a GPS and/or data associated with the GPS such as GPS signal strength, number and information regarding available satellites, and so on. The metadata may include data from an IMU and/or data associated with the IMU, such as information about pitch, roll, yaw, acceleration vectors in x, y, z orientations, and acceleration vectors about an x-axis, about a y-axis, and about a z-axis.

In one embodiment, the metadata may be from and/or about other sensors of the UAV 12, non-exclusive examples of which include proximity sensors, LiDAR, methane gas sensors, carbon dioxide sensors, heat sensors, multi-spectral sensors (for example, four-band image sensors capable of detecting and/or recording red, green, blue and near infrared), and hyper-spectral sensors (for example, image sensors capable of detecting and/or recording a larger number of spectrum, including 16 or 32 band image—which may include red, green, blue and near infrared and additional spectrum).

In one embodiment, the metadata may include one or more of the following: whether the image 44 or associated image 44 was captured from the UAV 12, the particular type of the UAV 12 (such as, but not limited to, make, model, and/or an identification number of the UAV 12), whether the image 44 was captured from the ground, whether the image 44 was captured from a moving ground vehicle, whether the image 44 was captured from a manned aircraft, whether the image 44 was captured from some other source, and what type of image capture device 42 was used to capture the image 44.

In one embodiment, the metadata may be embedded in the image 44. In one embodiment, the metadata and the image 44 may be stored together in a single image file. In one embodiment, the image 44 may be part of an image file having an image header. The metadata may be embedded in the image header, such as in the header of a jpeg formatted file. In one embodiment, the jpeg header may be organized in a predetermined format such that the metadata is stored in a consistent manner in the jpeg header. For example, the position of the metadata in the header and/or the format of the title of the metadata in the header may be predetermined for consistency.

In one embodiment, the remote station 14 transforms the image file into a standard format for processing.

In one embodiment, the metadata and the image 44 may be stored in a removable non-transitory memory storage device, such as a memory card. The memory card may be removed from the UAS 10 to download the images 44 and the metadata.

In one embodiment, the images 44 and/or the metadata may be transmitted from the UAS 10 to the remote station 14. The images 44 and/or the metadata may be transmitted wirelessly and/or through a physical connection, such as wires. In one embodiment, the images 44 and/or the metadata may be processed by the processor 162 of the remote station 14.

In one embodiment, the images 44 and/or the metadata may first be downloaded wirelessly from the UAS 10 to the remote station 14. Then the images 44 and/or the metadata may be transmitted through a physical connection to a computer processor device where the images 44 and/or the metadata may be extracted and/or processed. For example, the images 44 and/or the metadata may be transmitted a smartphone, a tablet personal computer, a personal computer processor, and/or other personal computing device.

In one embodiment, the UAS 10 may have an application program interface (API).

In one embodiment, the metadata is captured by the image capture device 42 at the time the image 44 is captured.

In one embodiment, the image capture device 42 captures none of, or less than all of, the metadata. In such a case, some or all of the metadata may be captured by the controller 22, the avionics system 30, the navigation system 32, and/or the sensors 140 of the UAS 10. In such a case, the metadata from the time an individual image 44 is taken is matched with that individual image 44.

In one embodiment, the controller 22 transmits one or more signal to the image capture device 42 instructing the image capture device 42 to capture an image 44. At the same time the image 44 is captured, the controller 22 may record the metadata. The metadata may be combined with the image 44 by the controller 22, or may be combined with the image 44 after the image 44 and the metadata are transmitted from the UAV 12 to the remote station 14.

In one embodiment, the metadata contains time data and the images 44 contain time data, and the metadata may be matched to the images 44 by matching the metadata time data to the image time data.

The metadata may be combined with the images 44 in the header of the image file, such as a jpeg header for a jpeg image file.

Metadata may not be necessary in all analysis scenarios, for example, when visual data from an image is sufficient. However, other creation and/or analyses may benefit from and/or require metadata—for example, creation of a three-dimensional model.

In one embodiment, one or more of the images 44 may be geolocated and/or georeferenced.

Geolocating the image 44 comprises associating the image 44 with a location or structure in a location. One example of use for geolocation of the image 44 is for images 44 depicting objects above the ground without depicting the ground, or without ground location information, or without access to surface location information for the objects depicted. For example, an image may depict a chimney on a roof without depicting the ground location. Metadata can be used to associate the image 44 with a particular location or structure. For example, metadata can be used that is associated with the one or more image capture device 42 at the time the aerial images 44 were captured, such as latitude and longitude of the one or more image capture device 42 and/or one or more of altitude, orientation, attitude, and bearing of the one or more image capture device 42. The metadata can be correlated to the location or structure of interest thereby associating the image 44 with the location or structure of interest.

Georeferencing the images 44 may comprise processing the images 44 to determine and assign geographic location information for the pixels of the images 44. For example, the images 44 may be processed as described in U.S. Pat. No. 7,424,133, issued Sep. 9, 2008, titled "Method and Apparatus for Capturing, Geolocating and Measuring Oblique Images;" and/or U.S. Patent Publication US20150221079A1, published Aug. 6, 2015, titled "Augmented Three Dimensional Point Collection of Vertical Structures;" all of which are hereby incorporated by reference in their entirety herein.

The geographic location information may include geographic coordinates for the ground as well as structures and objects located above the ground in the image 44. The geographic location information for the pixels of the image 44 may be a part of the metadata associated with the image 44.

Georeferencing the images 44 may be based at least in part on one or more known ground points and/or surface points. Nonexclusive examples of known ground points and/or surface points include digital elevation models (DEMs), point clouds, three-dimensional models, individually plotted/mapped points, and tessellated ground planes.

In one embodiment, the images 44 may be georeferenced based at least in part on searching for and locating one or more surface model or point cloud having locations within a predetermined proximity of the location of the UAV 12 and/or in the direction of orientation of the UAV 12. In one embodiment, the images 44 may be georeferenced based at least in part on searching for and locating one or more ground point or ground plane having ground locations within a predetermined proximity of the UAV 12.

Figure 25:
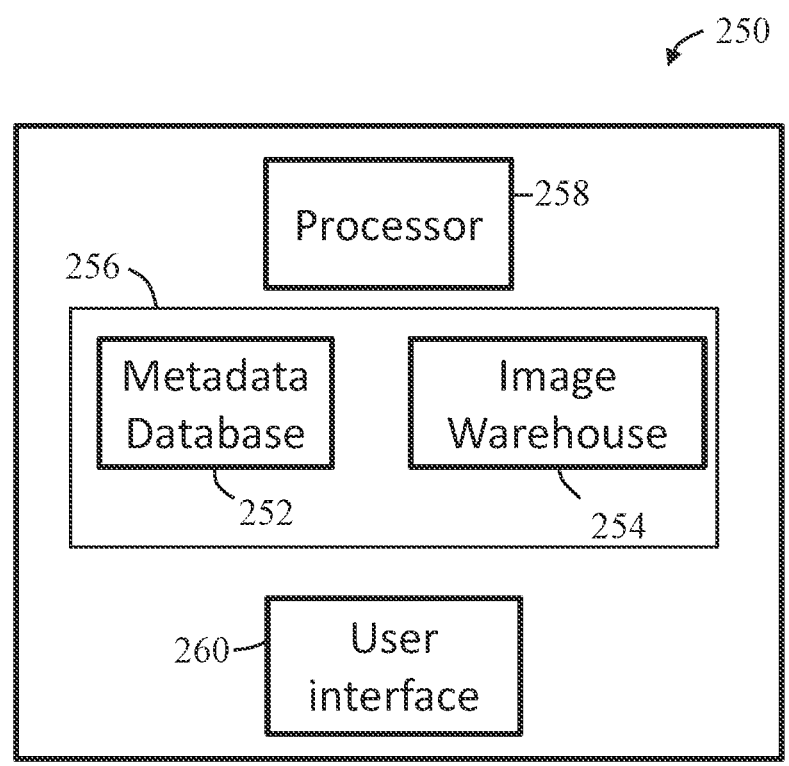
FIG. 25 is a block diagram of an exemplary embodiment of an image location system in accordance with the present disclosure.
Figure 26:
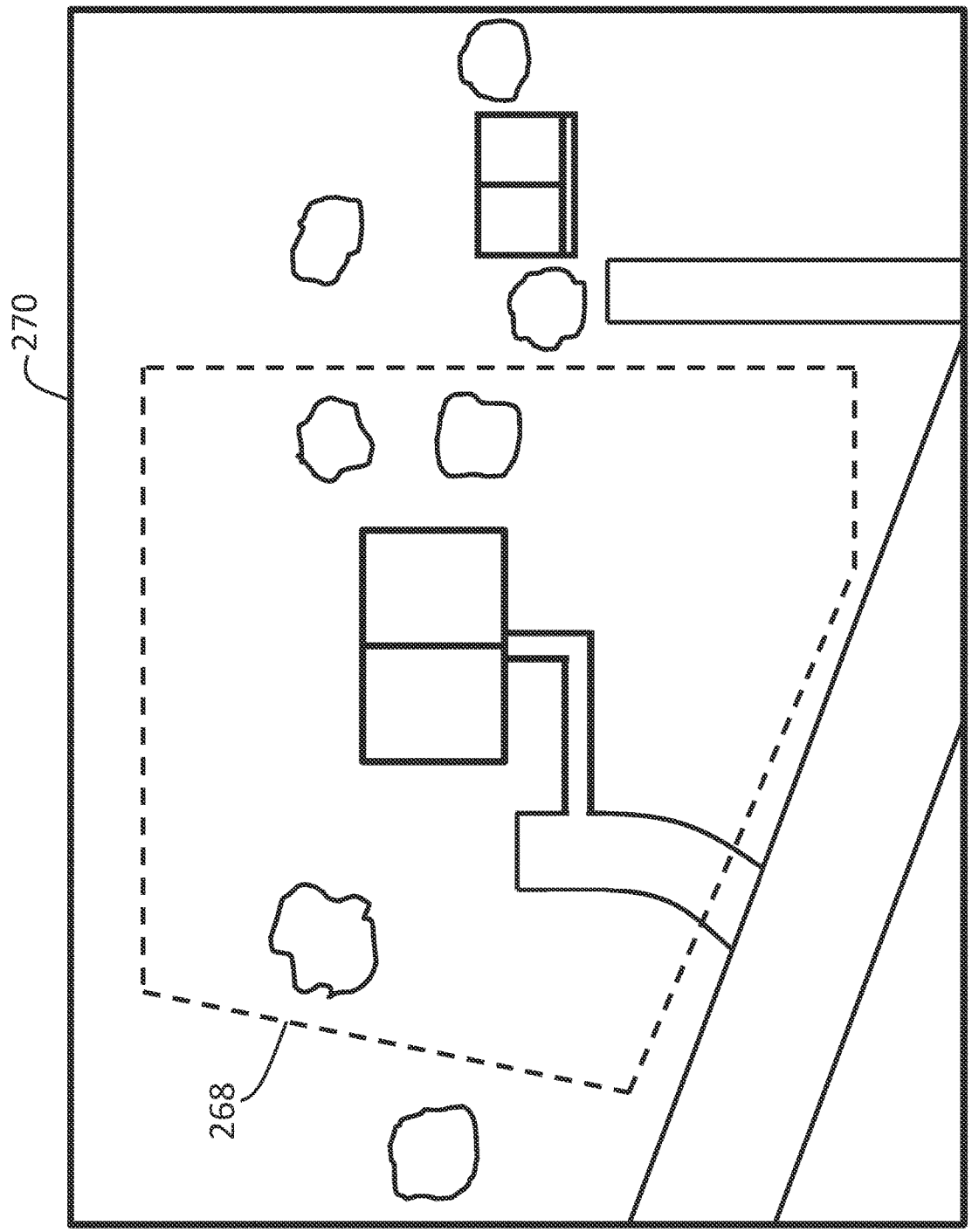
FIG. 26 is an exemplary embodiment of an overview image in accordance with the present disclosure.

An image location system 250 constructed in accordance with the current disclosure is illustrated in FIG. 25. The image location system 250 may comprise a metadata database 252 and an image warehouse database 254 stored in one or more non-transitory computer memory 256. The image location system 250 may further comprise one or more processor 258 and one or more user interface 260.

In one embodiment, the metadata is stored in the metadata database 252 and the images 44 are stored in the image warehouse database 254. Metadata and images 44 may be received from multiple UASs 10 and/or multiple UAVs 12 of various types. The metadata may initially be received in varying formats depending on the type of UAV 12 transmitting the metadata. The metadata may be transformed into a standardized format. The metadata may be stored with a standardized format.

The metadata may be stored in the metadata database 252 and associated with the image 44 and/or the image file. The metadata may include a file path of the associated image 44 and/or the image file.

In one embodiment, one or more of the metadata, the metadata database 252, the images 44, and the image warehouse database 254 may be stored in one or more remote locations, such as cloud storage.

In one embodiment, the metadata database 252 and/or the image warehouse database 254 may be spatial databases. That is, the metadata database 252 and/or the image warehouse database 254 may be structured with spatial (locational) connections such that spatial conclusions and results can be reached. The metadata database 252 and/or the image warehouse database 254 may be able to search for, find, and return to a user data based on an input location. For example, a user may request images 44 within one mile of a location and the metadata database 252 and/or the image warehouse database 254 may return such information. In another example, the user may request images 44 within a polygon drawn on an overview image. In another example, the user may request images 44 based on other location information.

A user may utilize the image location system 250 to locate image(s) 44 and/or metadata for a particular geographic area or structure. In one embodiment, the user may search for images 44 of a structure and/or geographic location by inputting geographic coordinates through the user interface 260. In one embodiment, the user may search for images 44 by choosing one or more points, facets, components, or areas of a structure in an image, floorplan, 2D model, or 3D model, as shown in FIGS. 30-38. In one embodiment, the user may search for images 44 of the structure and/or geographic location by inputting a polygon 268 (such as a 2D or 3D polygon) of geographic coordinates through the user interface 260. In one embodiment, the user may input geographic points, and the processor 258 of the image location system 250 may form the polygon 268 of geographic coordinates from the inputted points.

In one embodiment, as shown in FIGS. 30-34, the polygon 268 may be located by the user on a structure in an image 44. In one embodiment, the polygon 268 may be an area or facet of a structure in an image 44. In one embodiment, the image location system 250 may utilize the polygon 268 in conjunction with the metadata associated with the image 44 and/or a two-dimensional outline and/or a three-dimensional model of the structure in the image 44 to identify the portion of the structure selected by the user. In one embodiment, the image location system 250 may allow the user to further specify a particular area of the structure.

The image location system 250 may search the metadata database 252 for geographic information in the metadata matching, or approximate to, the geographic coordinates entered by the user. The image location system 250 may then display images 44 associated with the metadata matching the geographic coordinates. The displayed images 44 contain pixels having matching geographic coordinates.

In one embodiment, the image location system 250 may search the metadata database 252 for points on the ground that match, or are approximate to, the geographic coordinates entered by the user. In one embodiment, the image location system 250 may search the metadata database 252 for points on the ground that are intersected by or enclosed within the polygon 268.

In one embodiment, the image location system 250 may search the metadata database 252 for points above the ground that match, or are approximate to, the geographic coordinates entered by the user. In one embodiment, the image location system 250 may search the metadata database 252 for points above the ground that are intersected by or enclosed within the polygon 268. Points above the ground may be geographic location points on structures or vegetation above the ground.

In one embodiment, the image location system 250 may return images of the structure. In one embodiment, the image location system 250 may return images that depict the particular area of the structure chosen by the user.

The images 44 may depict structures and/or vegetation without depicting the ground. For example, images 44 taken by an image capture device 42 with a perspective pointed toward the horizon, or at an angle upwards from the horizon, may not depict the ground. In such a case, the image location system 250 may search the metadata for recorded locations of the image capture device 42 in which the image capture device 42 location matches, intersects, or is enclosed in, the inputted coordinates and/or polygon 268.

In one embodiment, the image location system 250 may calculate, and or store, data indicative of points on, in, and/or the outline of, one or more structures and/or vegetation depicted in the images 44, the attitude of the image capture device 42, and the bearing of the image capture device 42 (i.e., the direction the image capture device 42 was pointing when the image 44 was captured). The data can be stored in the metadata database 252. Utilizing the data, the image location system 250 may determine the geographic coordinates (X, Y, and Z) where the view of the image capture device 42 intersects the one or more structure and/or vegetation. The image location system 250 may utilize the intersection geographic coordinates as a geographic marker for the image 44. The image location system 250 may match the inputted geographic coordinates to the intersection geographic coordinates to locate an image 44 depicting a geographic location having geographic coordinates matching or within a predetermined distance relative to inputted geographic coordinates and/or polygon 268.

In one embodiment, a user may search for images 44 with the image location system 250 by inputting a geo-code. For example, the user may enter a street address and receive a property parcel's geometry, that is, a property parcel polygon of the property line of a land parcel or building. The user may use the received property parcel polygon as polygon 268 to input into the image location system 250 to request any images 44 for that polygon, that is, any images 44 that intersect the polygon 268 or that are associated with the property within the polygon.

In one embodiment, the user may search for images 44 with the image location system 250 by selecting the polygon 268 that was formed by the operator of the UAV 12 when establishing boundaries 210 of the operation box 211 when one or more of the images 44 were originally captured by the image capture device 42 of the UAV 12.

In one embodiment, the metadata includes a street address. The street address may be acquired by an operator of the UAS 10. The street address may be associated with the images 44 captured by the UAS 10 while the UAS 10 is operated to capture images 44 at the street address.

In one embodiment, the image location system 250 may process one or more of the images 44 before a user utilizes the image location system 250. In one embodiment, the image location system 250 may create one or more 3D model based on the images 44 and the metadata, calculate one or more virtual nadir camera view, and then create an ortho-mosaic based on the 3D model and virtual nadir camera views.

In one embodiment, the image location system 250 may process one or more of the images 44 and/or the metadata and create one or more three-dimensional point clouds and/or one or more three-dimensional models based at least in part on the images 44 and/or the metadata. In one embodiment, the metadata may be used to produce more accurate results to existing or new models and/or images 44.

In one embodiment, the image location system 250 may process one or more of the images 44 by ortho-rectifying the images and stitching the images 44 together using tie points to create an ortho-mosaic.

In one embodiment, the ortho-mosaic may be divided into tiles (for example, tiles 256x256 in size). The image location system 250 may display one or more tiles to the user, such as when the user views the ortho-mosaic in a web-based browser. The tiles may be in a standardized format for use in multiple types of web-based browsers.

Referring now to FIGS. 26-29, in one embodiment, the image location system 250 may provide multiple images 44 from different perspectives to the user. For example, the image location system 250 may initially provide an overview image 270, such as a top-down (nadir) view, of an entire area/property. In one embodiment, the image location system 250 may display an overlay of the polygon 268 on the overview image 270.

In one embodiment, the image location system may display image tiles or "thumbnail" images 272 (that is, preview images smaller in initial size than the overview image 270) of additional images 44 of the property from different perspectives, different distances, and/or different areas of the property for the user to choose to display. For example, the thumbnail images 272 may be displayed outside of the overview image 270, such as on one side of the overview image 270, as shown in FIG. 27.

Figure 27:
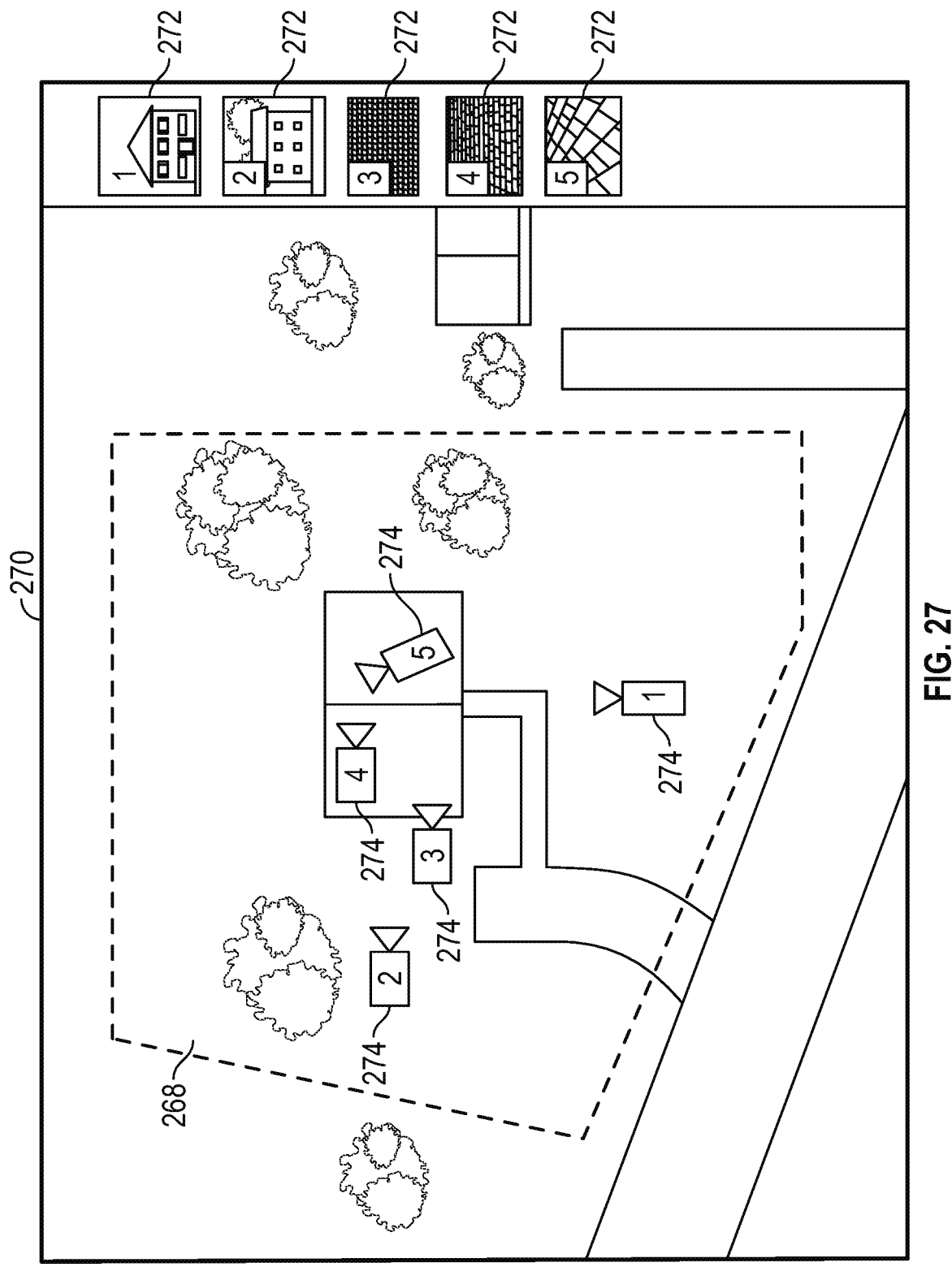
FIG. 27 is an exemplary embodiment of an overview image having thumbnail images in accordance with the present disclosure.
Figure 28:
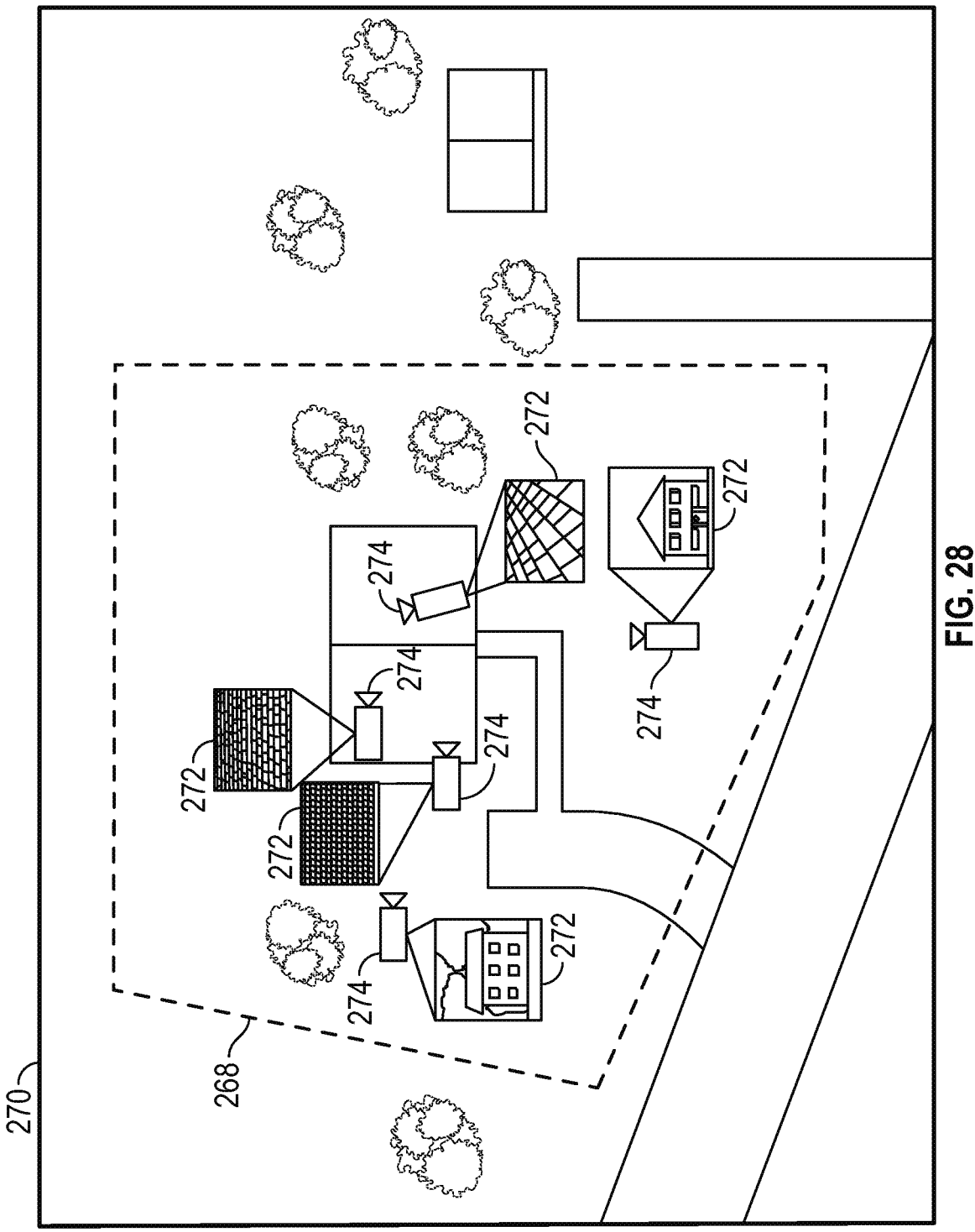
FIG. 28 is an exemplary embodiment of an overview image having icons in accordance with the present disclosure.
Figure 29:
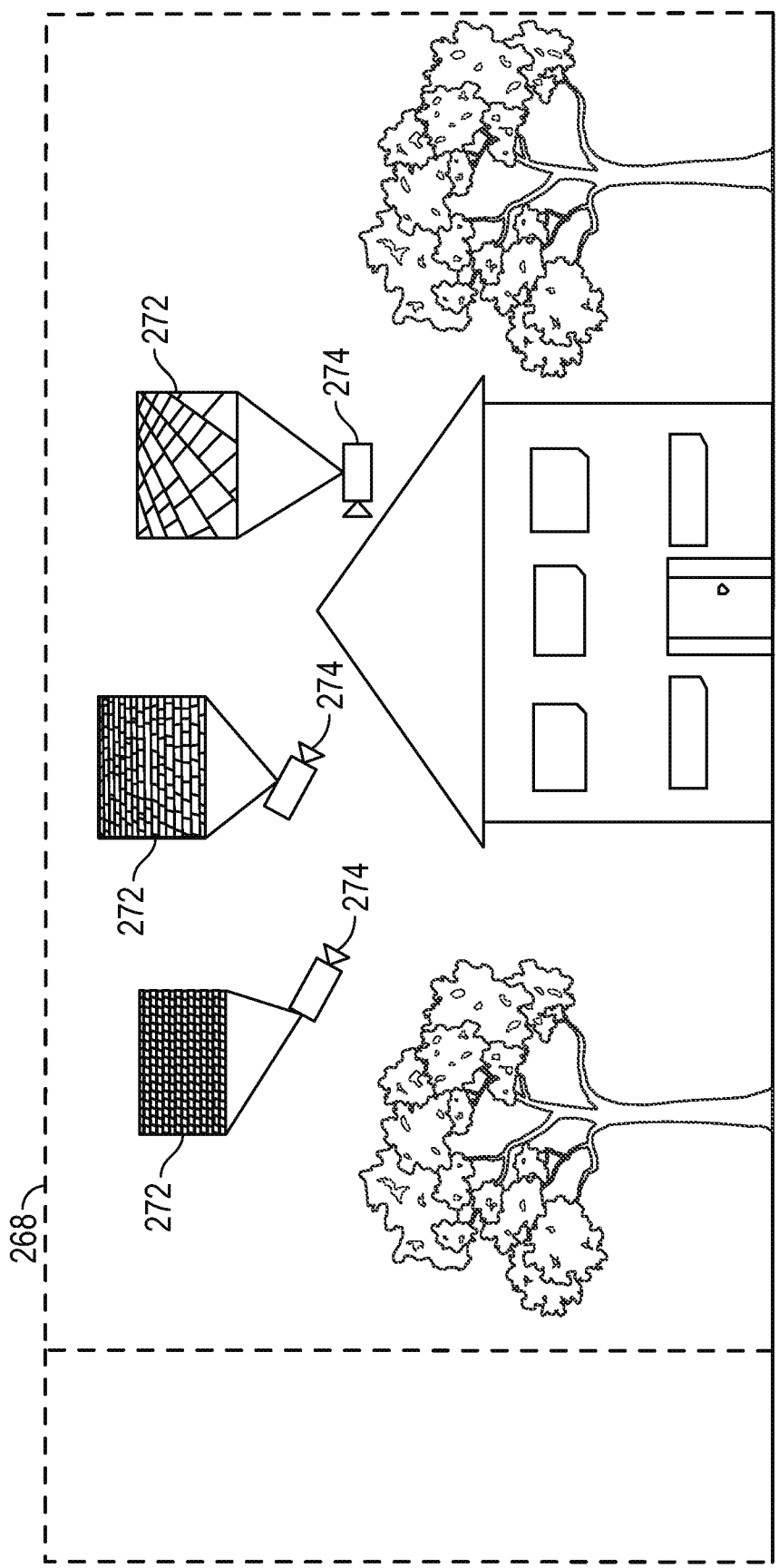
FIG. 29 is an exemplary embodiment of an image in accordance with the present disclosure.

As illustrated in FIGS. 27-29, in one embodiment, the overview image 270 and or other images (see FIG. 29) may have icons 274 on and/or beside the overview image 270 to show where the additional images 44 (for example, those represented by the thumbnail images 272) were taken and which direction the image capture device 42 was facing when the additional images 44 were taken.

In one embodiment, the user may select the icon 274 and the image location system 250 may highlight the thumbnail image 272 associated with the icon 274. In one embodiment, the user may select the thumbnail image 272 and the image location system 250 may highlight the portion of the overview image 270 where the image associated with the thumbnail image 272 was captured. In one embodiment, the user may select the icon 274 and the thumbnail image 272 may be displayed. In one embodiment, the user may select the icon 274 and the additional image 44 may be displayed in full.

The overview image 270 provides the user with an overall perspective of where additional images 44 are available. The additional images 44 may depict less than the total area of the property. For example, the image capture device 42 may capture a particular image 44 of a four foot by four foot section of a roof of a structure. If a user views this particular image 44 of the roof section, the user may have difficulty knowing the location of the roof section in relation to the entire structure and/or the property. The image location system 250 may provide links to the overall overview image 270 and/or an ortho-mosaic to help orientate the user. For example, if the particular image 44 of the roof section is to be used for insurance claims, the image location system 250 may give a reference as to where the image capture device 42 was located and orientated when the particular image 44 was captured such that the location of damage to the roof may be ascertained.

In one embodiment, the image location system 250 may display the icon 274 on the overview image 270 to indicate the location of the image capture device 42 and/or the orientation of the image capture device 42 (that is, the direction, the bearing, of the viewpoint of the image capture device) at the time the image 44 was captured. In one embodiment, the icon 274 may include a pie shape indicative of the direction the image 44 was taken (that is, which way the image capture device 42 was facing, the angle view the image capture device 42 had when the image capture device 42 captured the image 44).

In one embodiment, the images 44 may be labeled as to what type of image 44 and/or how the image 44 was captured. For example, the image 44 may be labeled as being captured by the UAV 12. In one embodiment, the thumbnail image 272 and/or the icon 274 may be labeled to indicate the type of image 44 and/or how the image 44 was captured.

In one embodiment, the images 44, the icons 274, and/or the thumbnail images 272 displayed on and/or adjacent to the overview image 270, may be labeled with one or more of the following metadata: whether the image 44 or associated image 44 was captured from the UAV 12, the particular type of the UAV 12 (such as, make, model, and/or an identification number of the UAV 12), whether the image 44 was captured from the ground, whether the image 44 was captured from a moving ground vehicle, whether the image 44 was captured from a manned aircraft, whether the image 44 was captured from some other source, what type of image capture device 42 was used to capture the image 44, or the like.

In one embodiment, the user may select one or more points in the overview image 270 and the image location system 250 may display one or more additional image 44 to show a visual depiction related to the one or more selected points. In one embodiment, the user may select the polygon 268 and the image location system 250 may display all of the additional images 44 available that are encompassed by the polygon 268.

In one embodiment in use, as illustrated in FIGS. 30-38, a user may search for images 44 by selecting an area, a facet 276, a point 278, a component 280, and/or an intersection of a structure in a first image 44 or in a 2D model 282 or 3D model 284. For example, the user may click on an area or facet of the structure, or draw a shape, such as polygon 268 on an area of the structure.

The image location system 250 may detect when the user selects an area or facet 276 of the structure, such as by utilizing two-dimensional outlines and/or three-dimensional models of the structures that are associated with geographic locations on the earth and metadata from the images 44. The image location system 250 may allow the user to further specify a particular area of a structure of interest after a first selection by the user. If the user draws a circle or polygon 268 (or even single clicks to specify a point 278), image location system 250 may further allow the user to specify a particular area, component, and/or element of that structure in which the user is interested. Non-exclusive examples of area, component 280, and/or elements of structures that may be specified include one or more wall, roof plane, roof, floor, door, window, intersection, and cross-section, or portion or combination thereof. The image location system 250 may return images 44 to the user, not just in the geographic proximity to a structure, but that include the area of interest in three dimensional coordinates above the ground and on the structure.

Figure 30:
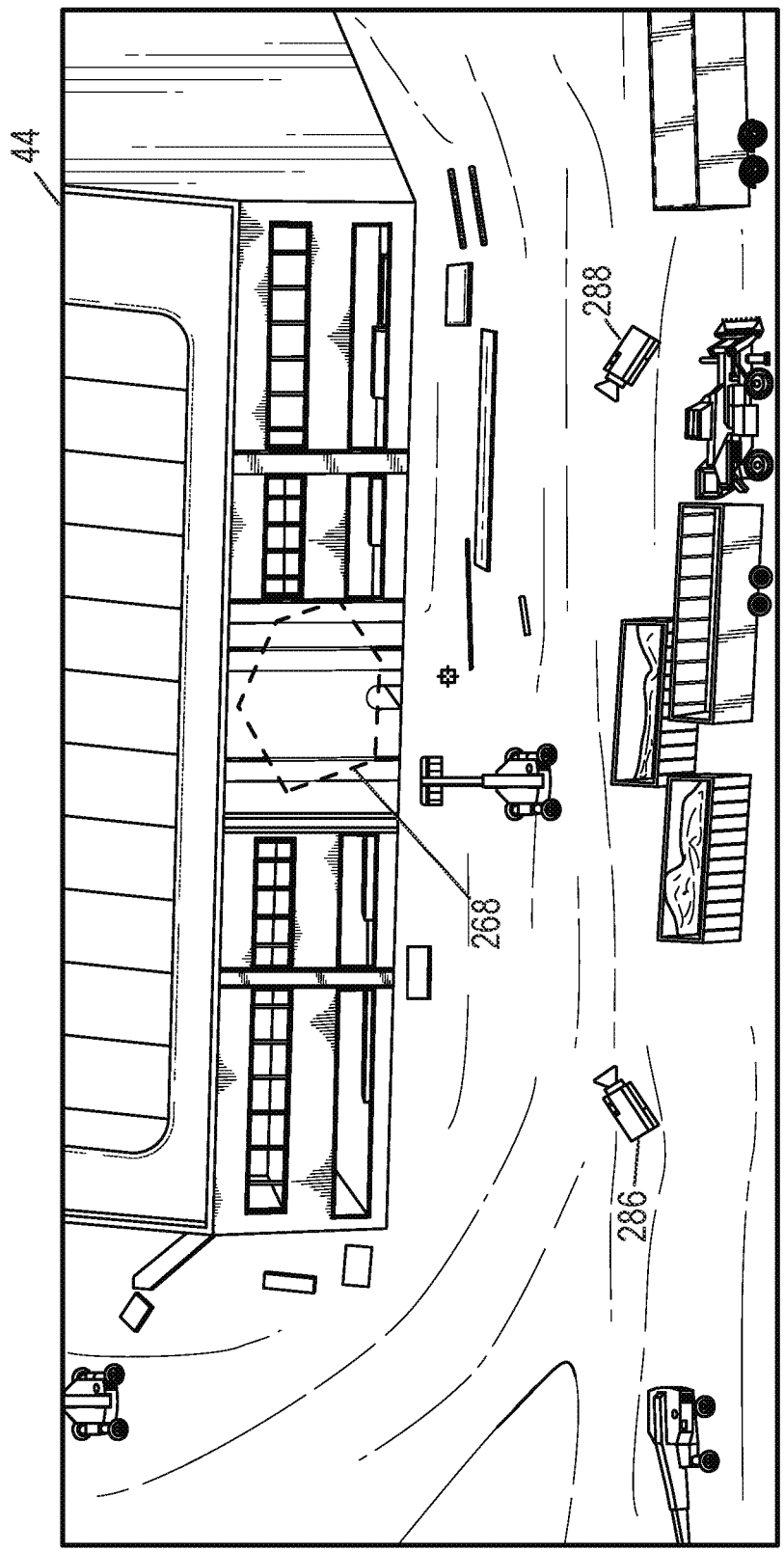
FIG. 30 is an exemplary embodiment of a user search area on an image in accordance with the present disclosure.
Figure 31:
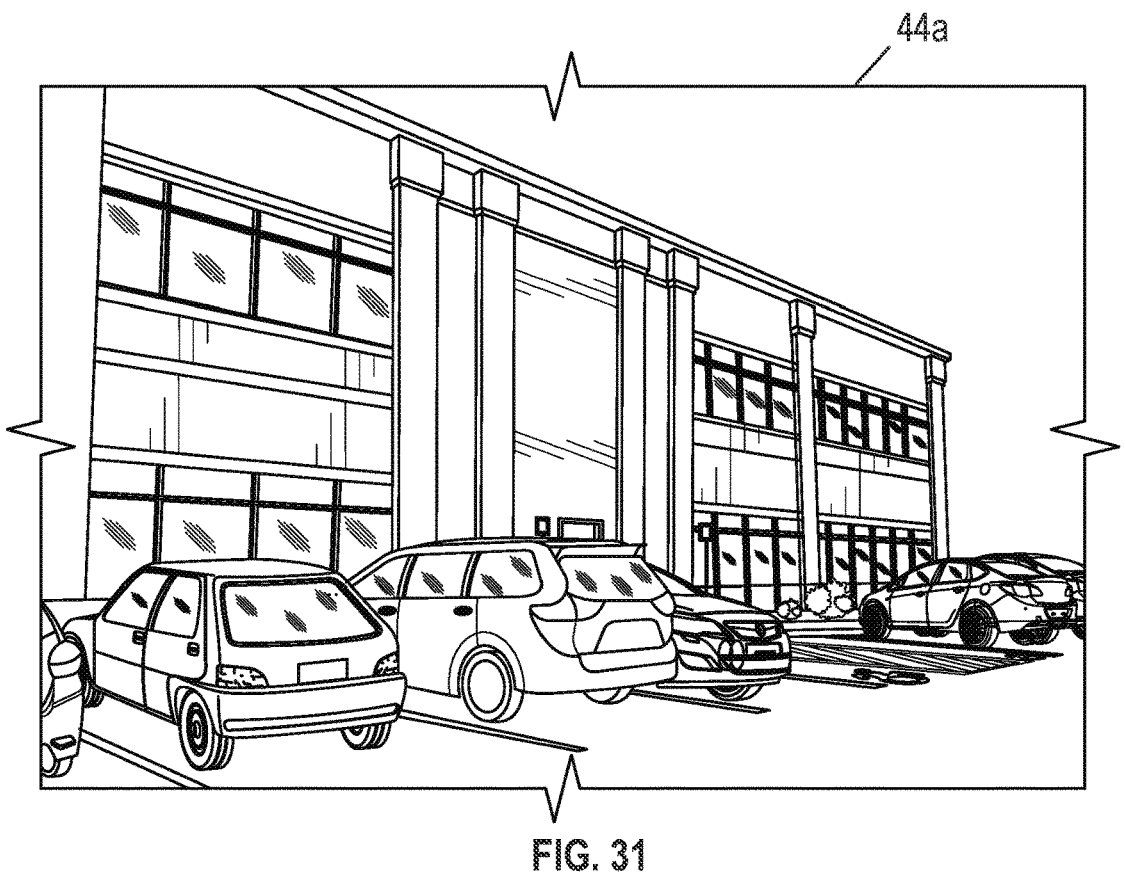
FIG. 31 is an exemplary embodiment of a returned image based on the search area of FIG. 30 in accordance with the present disclosure.
Figure 32:
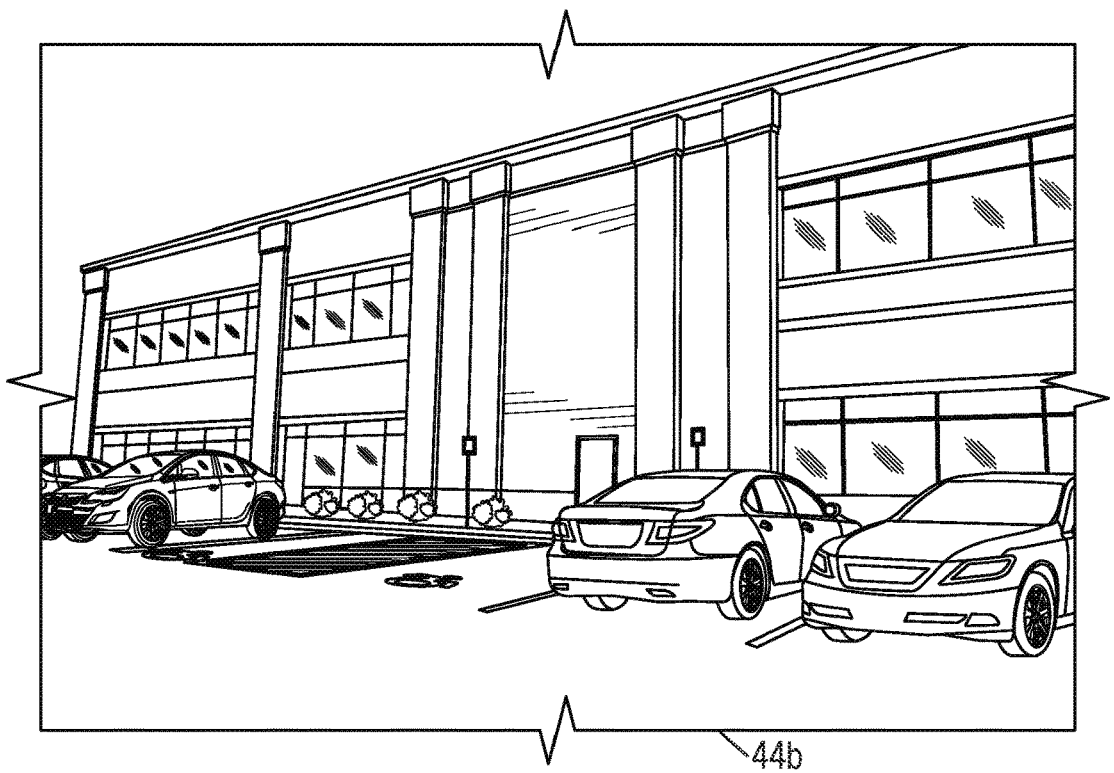
FIG. 32 is an exemplary embodiment of another returned image based on the search area of FIG. 30 in accordance with the present disclosure.
Figure 33:
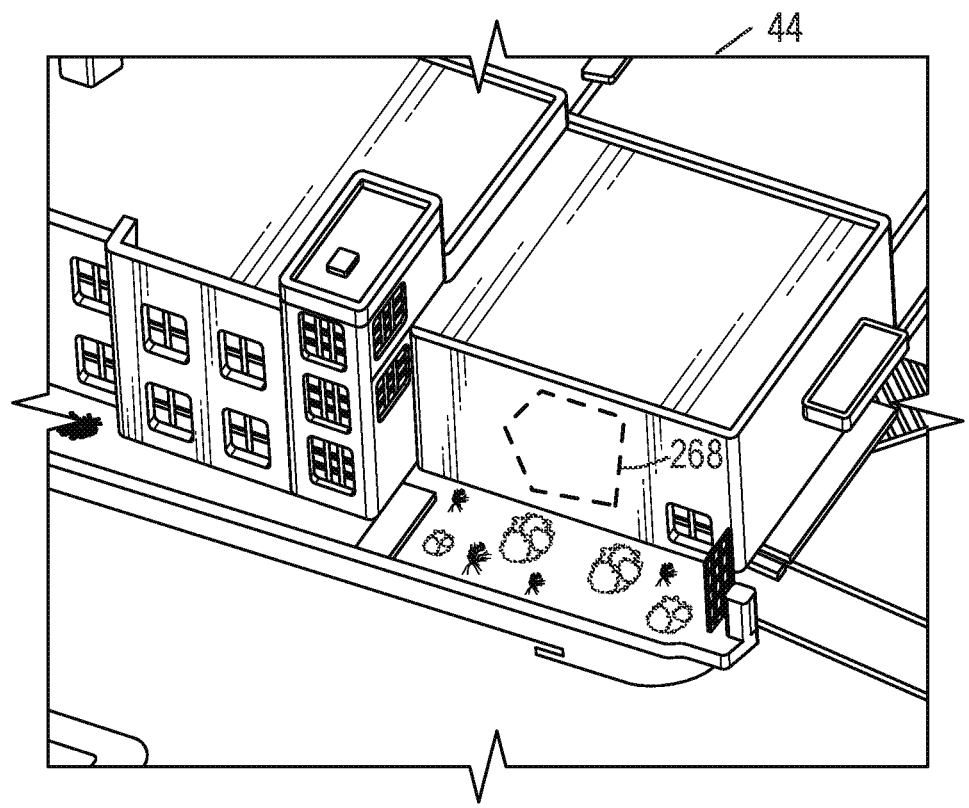
FIG. 33 is an exemplary embodiment of another user search area on an image in accordance with the present disclosure.
Figure 34:
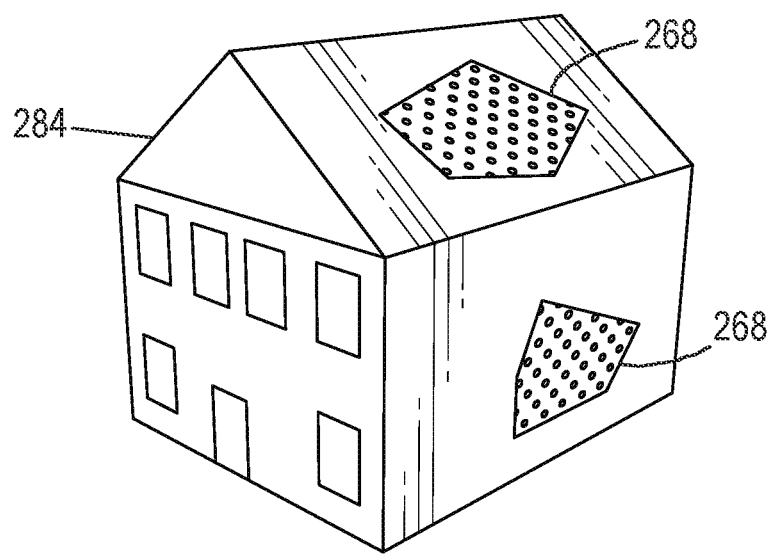
FIG. 34 is an exemplary embodiment of another user search area on a three dimensional model in accordance with the present disclosure.
Figure 35:
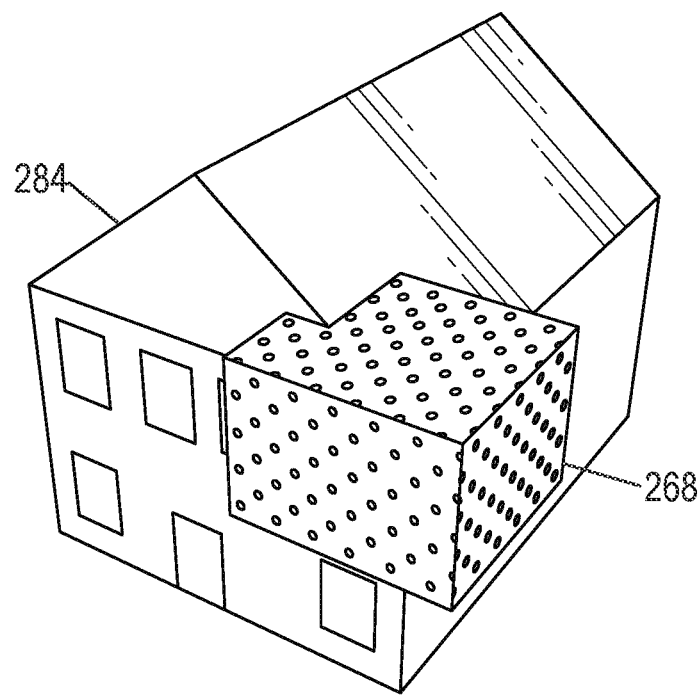
FIG. 35 is an exemplary embodiment of another user search area on a three dimensional model in accordance with the present disclosure.
Figure 36:
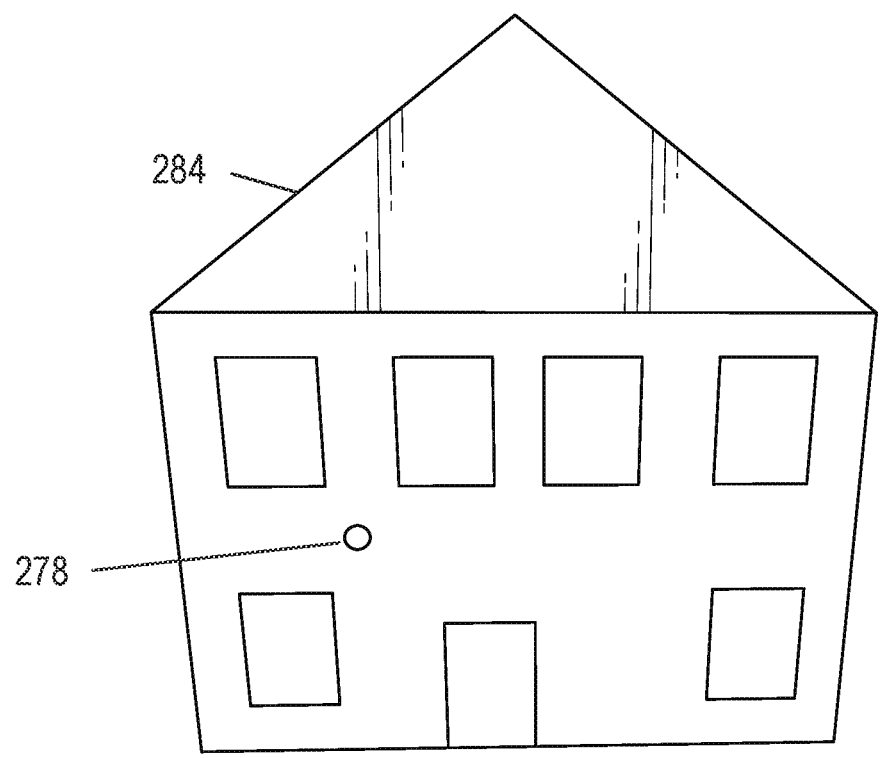
FIG. 36 is an exemplary embodiment of a user search point on a three dimensional model in accordance with the present disclosure.

For example, as shown in FIG. 30, the user may select an area, such as polygon 268, on a wall of interest on a structure in an image 44. Using the geo-reference information of the image 44 and/or information indicative of the structure's footprint and geographic location, the image location system 250 can determine that the user selected a section of wall on the structure in the image 44 and not just a point on the ground. The image location system 250 may search the metadata database 252 and/or the image warehouse database 254 for images 44 taken in that locality to discover images 44 that point to that region of the structure, such as images 44a and 44b shown in FIGS. 31 and 32. For example, images 44a and 44b, may have been taken by the image capture device 42 of the UAV 12 that depict the user selected location in polygon 268, such as by the image capture device 42 when the UAV 12 was in a first location 286 and/or in a second location 288, as shown in FIG. 30.

Figure 37:
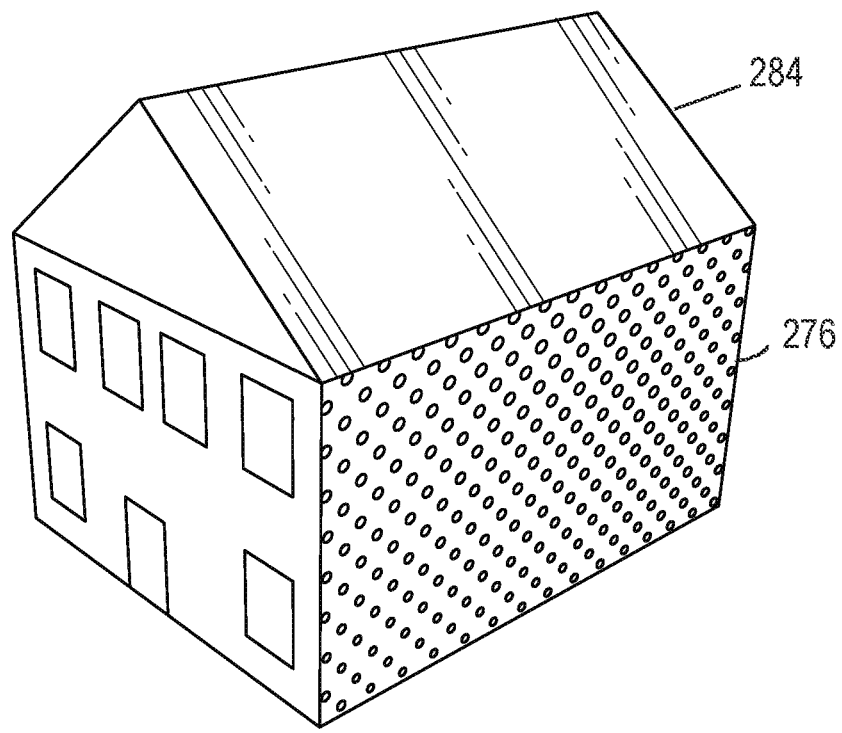
FIG. 37 is an exemplary embodiment of a user selected wall on a three dimensional model in accordance with the present disclosure.
Figure 38:
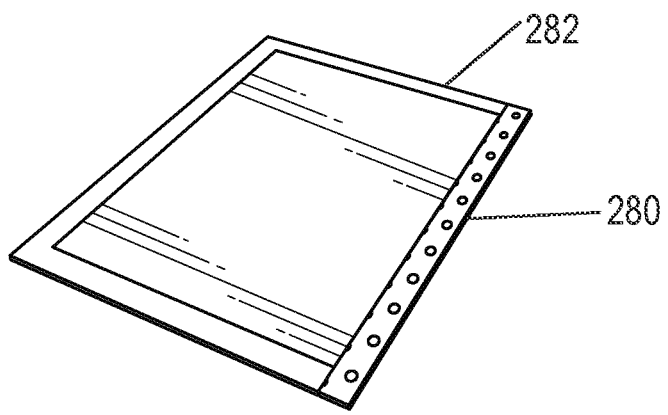
FIG. 38 is an exemplary embodiment of a user search area on a two dimensional model in accordance with the present disclosure.

In one embodiment, the user may simply click on a side or element of the structure in a first image 44 or in a 2D model 282 (as shown in FIG. 38) or 3D model 284 (as shown in FIG. 37) and be quickly presented with thumbnails of the images 44, or the images 44 themselves, that include that side or element of the structure. In one embodiment, search results to the user may include ground shots by an adjuster, street-view, drone, selfie stick, manned aerial, 3D models, etc.

While several embodiments of the inventive concepts have been described for purposes of this disclosure, it will be understood that numerous changes may be made which will readily suggest themselves to those skilled in the art and which are accomplished within the spirit of the inventive concepts disclosed and as defined in the appended claims.

Additionally, it will be understood that components or systems described in certain embodiments may be used in combination with components or systems in other embodiments disclosed herein. Further, it will be understood that other components required for the UAS 10 to be operational are well known in the art such that a person having ordinary skill in the art would readily know how to select and use those components according to the intended use of the UAS 10.

What is claimed is:

1. An unmanned aerial vehicle, comprising:
   an image capture device; and
   a controller programmed or hardwired to control fields of view of the image capture device during flight of the unmanned aerial vehicle such that items outside of boundaries surrounding a geographic area are not captured in any of one or more images captured by the image capture device during the flight, by:
      determining a flight plan of the unmanned aerial vehicle, the flight plan configured such that the unmanned aerial vehicle and fields of view of the image capture device are restricted to the geographic area within the boundaries;
      executing the flight plan;
      orientating the image capture device by utilizing data about a geometric shape of the boundaries and data from attitude sensors to restrict the fields of view of the image capture device, thereby avoiding capturing images of areas outside of the boundaries while the unmanned aerial vehicle is flying the flight plan within the boundaries, and utilizing data about a structure within the geographic area within the boundaries, to ensure that the image capture device is oriented such that only the structure is in a frame of the one or more images taken by the image capture device when capturing the one or more images; and
      capturing, with the image capture device, the one or more images while executing the flight plan, the one or more images restricted to fields of view within the boundaries of the geographic area, such that items outside of the boundaries are not captured in any of the one or more images, the one or more images comprising a first image and a second image each depicting areas less than a total of the geographic area within the boundaries.

2. The unmanned aerial vehicle of claim 1, wherein the controller is configured to automatically cause the unmanned aerial vehicle to execute the flight plan.

3. The unmanned aerial vehicle of claim 1, wherein the controller is configured to execute the flight plan in conjunction with an operator utilizing a human-machine interface module of a remote station, and where in the controller is configured to:
   transmit one or more first non-transitory signal indicative of position of the unmanned aerial vehicle; and
   receive, from the remote station, one or more second non-transitory signal indicative of instructions for navigation of the unmanned aerial vehicle to maintain the unmanned aerial vehicle and the fields of view of the image capture device within the boundaries.

4. The unmanned aerial vehicle of claim 1, wherein the controller is configured to:
   utilize the boundaries of the geographic area to guide the unmanned aerial vehicle such that the fields of view of the image capture device of the unmanned aerial vehicle are within the boundaries.

5. The unmanned aerial vehicle of claim 1, wherein the controller is configured to:
   receive the boundaries of the geographic area.

6. The unmanned aerial vehicle of claim 1, wherein the controller is configured to:
   receive, from an operator, identification of two or more points on the boundaries; and
   determine the boundaries based on the identified two or more points.

7. The unmanned aerial vehicle of claim 1, wherein the unmanned aerial vehicle further comprises a navigation system, and wherein the controller is configured to:
   utilize the navigation system and coordinates of the boundaries to determine the flight plan for the unmanned aerial vehicle that the unmanned aerial vehicle and fields of view of the image capture device are restricted to the geographic area within the boundaries.

8. The unmanned aerial vehicle of claim 1, wherein the controller is configured to:
   receive geographical coordinates and/or altitude values that define the geometric shape on and/or above the earth of the geographical area that defines the boundaries.

9. The unmanned aerial vehicle of claim 8, wherein the geometric shape is a three-dimensional polygon, and further comprising maintaining, by the controller, the unmanned aerial vehicle inside the three-dimensional polygon.

10. The unmanned aerial vehicle of claim 8, wherein the geometric shape is defined by parcel data and/or building outlines.

11. The unmanned aerial vehicle of claim 1, wherein the controller is configured to:
   compare position of the unmanned aerial vehicle, based on data from position sensors, with coordinates of the boundaries of the geographic area.

12. The unmanned aerial vehicle of claim 1, wherein the controller is configured to:
   direct the unmanned aerial vehicle to adjust position and/or orientation to maintain a position of the unmanned aerial vehicle within the geographic area within the boundaries if a distance between the position of the unmanned aerial vehicle and the boundaries is less than or above a predetermined amount.

13. The unmanned aerial vehicle of claim 1, wherein the controller is configured to:
   direct the unmanned aerial vehicle to adjust position and/or orientation such that the field of view of the image capture device is solely within the geographic area within the boundaries.

14. A method for capturing images, comprising:

utilizing a controller programmed or hardwired to control fields of view of an image capture device of an unmanned aerial vehicle during flight of the unmanned aerial vehicle such that items outside of boundaries of a geographic area identified by coordinates of the geographic area are not captured in any of one or more images captured by the image capture device during the flight, by:

determining a flight plan of the unmanned aerial vehicle, the flight plan configured such that the unmanned aerial vehicle and fields of view of the image capture device are restricted to the geographic area within the boundaries;

executing the flight plan;

orientating the image capture device by utilizing data about a geometric shape of the boundaries and data from attitude sensors to restrict the fields of view of the image capture device, thereby avoiding capturing images of areas outside of the boundaries while the unmanned aerial vehicle is flying the flight plan within the boundaries, and utilizing data about a structure within the geographic area within the boundaries, to ensure that the image capture device is oriented such that only the structure is in a frame of the one or more images taken by the image capture device when capturing the one or more images; and capturing, with the image capture device, the one or more images while executing the flight plan, the one or more images restricted to fields of view within the boundaries of the geographic area, such that items outside of the boundaries are not captured in any of the one or more images, the one or more images comprising a first image and a second image each depicting areas less than a total of the geographic area within the boundaries.

15. The method for capturing images of claim 14, wherein executing the flight plan is carried out automatically by the controller of the unmanned aerial vehicle.

16. The method for capturing images of claim 14, wherein executing the flight plan is at least partially carried out by an operator utilizing a human-machine interface module of a remote station, and further comprising:

receiving, by the remote station, one or more first non-transitory signal indicative of position of the unmanned aerial vehicle; and transmitting, from the remote station to a communications system of the unmanned aerial vehicle, one or more second non-transitory signal indicative of instructions for navigation of the unmanned aerial vehicle to maintain the unmanned aerial vehicle such that the field of view of the image capture device is solely within the geographic area within the boundaries.

17. The method for capturing images of claim 14, wherein orientating the image capture device further comprises:

utilizing 3D data about the structure within the geographic area within the boundaries.

18. The method for capturing images of claim 14, further comprising:

receiving, by the unmanned aerial vehicle, geographical coordinates and/or altitude values that define the geometric shape on and/or above the earth of the geographical area that defines the boundaries.

19. The method for capturing images of claim 18, wherein the geometric shape is defined by parcel data and/or building outlines.

* * * * *

UNITED STATES PATENT AND TRADEMARK OFFICE
CERTIFICATE OF CORRECTION

| | | |
|---|---|---|
| PATENT NO. | : 12,079,013 B2 | Page 1 of 1 |
| APPLICATION NO. | : 17/495988 | |
| DATED | : September 3, 2024 | |
| INVENTOR(S) | : Mark A. Foster et al. | |

It is certified that error appears in the above-identified patent and that said Letters Patent is hereby corrected as shown below:

In the Specification

Column 19, Line 40: Delete "jcontroller" and replace with -- controller --

Signed and Sealed this
First Day of October, 2024

Katherine Kelly Vidal
Director of the United States Patent and Trademark Office